US012775692B2

(12) United States Patent
Piercey et al.

(10) Patent No.: US 12,775,692 B2
(45) Date of Patent: Oct. 27, 2026

(54) SYSTEM AND METHOD FOR DISTRIBUTED MANAGEMENT OF CONSUMER DATA

(71) Applicant: AffinitiQuest.io, Kanata (CA)

(72) Inventors: Ben Piercey, Richmond (CA); Jason Mac Donell, Ottawa (CA)

(73) Assignee: AffinitiQuest.io, Ottawa (CA)

( * ) Notice: Subject to any disclaimer, the term of this patent is extended or adjusted under 35 U.S.C. 154(b) by 483 days.

(21) Appl. No.: 18/274,408

(22) PCT Filed: Jan. 25, 2022

(86) PCT No.: PCT/CA2022/050099
§ 371 (c)(1),
(2) Date: Jul. 26, 2023

(87) PCT Pub. No.: WO2022/160039
PCT Pub. Date: Aug. 4, 2022

(65) Prior Publication Data
US 2024/0086519 A1 Mar. 14, 2024

Related U.S. Application Data

(60) Provisional application No. 63/141,747, filed on Jan. 26, 2021.

(51) Int. Cl.
*G06F 21/45* (2013.01)
*G06F 21/32* (2013.01)
*G06F 21/62* (2013.01)

(52) U.S. Cl.
CPC .............. *G06F 21/45* (2013.01); *G06F 21/32* (2013.01); *G06F 21/6254* (2013.01)

(58) Field of Classification Search
CPC ...... G06F 21/32; G06F 21/45; G06F 21/6254; G06F 21/64; H04L 63/08; H04L 63/12; H04L 63/20
See application file for complete search history.

(56) References Cited

U.S. PATENT DOCUMENTS 10,860,735 B2 12/2020 Naqvi et al.
2018/0150647 A1* 5/2018 Naqvi .................... H04L 9/321
(Continued)

FOREIGN PATENT DOCUMENTS

WO 2020176691 A1 9/2020

*Primary Examiner* — Theodore C Parsons
(74) *Attorney, Agent, or Firm* — BRION RAFFOUL

(57) ABSTRACT

System and method for distributed management of consumer data. The system verifies anonymized credential objects that represent consumer experiences/interests/preferences/etc. Credential schema data outlining desired attributes of a specific credential is provided by an organization user and is written to a distributed ledger. Responsive to a request from a consumer user's computing device, a credential delivery device delivers available credential object (s) to that computing device. A credential verification device receives a verification request from the computing device and prompts creation of a response value related to the credential's desired attributes) on the consumer user's computing device. When the response value conforms to requirements derived from the credential schema data, a first result is prompted; otherwise, a second result is prompted. In some embodiments, the response value is a zero-knowledge-proof (ZKP). Delivery and verification can be performed using Bluetooth (BT), Bluetooth Low Energy (BLE), near field communications (NFC), QR codes, etc.

20 Claims, 25 Drawing Sheets

(56) References Cited

U.S. PATENT DOCUMENTS

| | | | | |
|---|---|---|---|---|
| 2019/0080406 | A1* | 3/2019 | Molinari | G06Q 40/02 |
| 2019/0188411 | A1 | 6/2019 | Kroutik | |
| 2019/0303600 | A1 | 10/2019 | Hamel et al. | |
| 2020/0014691 | A1* | 1/2020 | Ortiz | H04L 63/0807 |
| 2020/0220726 | A1* | 7/2020 | Lougheed, III | G06F 16/211 |
| 2022/0261882 | A1* | 8/2022 | Youb | G06Q 50/16 |

* cited by examiner

FIG. 10D
User Mobile Camera
Mobile
IoT Agent
MCX API
Indy Connector
Indy
OUTCOME LOGIC
Cache Proof/Outcomes for current Experience
SEE VERIFY FLOW...
If Valid
Outcome A
Execute Outcome
If NOT Valid
Outcome B
Execute Outcome
Outcome Flow

SYSTEM AND METHOD FOR DISTRIBUTED MANAGEMENT OF CONSUMER DATA

CROSS REFERENCE TO RELATED APPLICATIONS

This application is a 35 U.S.C. 371 national stage filing and claims priority to International Application No. PCT/CA2022/050099 filed on Jan. 25, 2022, entitled "SYSTEM AND METHOD FOR DISTRIBUTED MANAGEMENT OF CONSUMER DATA" which claims the benefit of U.S. application Ser. No. 63/141,747 filed on Jan. 26, 2021, each of which are incorporated herein by reference in their entirety.

RELATED APPLICATIONS

This application claims the benefit of U.S. Provisional Application No. 63/141,747 filed on Jan. 26, 2021, which is hereby incorporated herein by reference in its entirety.

TECHNICAL FIELD

The present invention relates to the management of consumer data. More specifically, the present invention relates to systems and methods for distributed management of consumer data.

BACKGROUND

The growth of the Internet and related technologies in recent years has led to the exponential growth in the collection and use of data. Moreover, data related to individual consumers can be extremely useful for retailers, producers, and other organizations. Such data allow these organizations to provide customized experiences, rewards, and benefits based on the individual consumer's needs, preferences and/or interests indicated by such data.

However, concerns around data protection and privacy, as well as difficulties and expenses related to storing such data, have also risen commensurately. In particular, many methods of storing and indexing data are arguably overbroad—that is, in many systems, substantial data that personally identifies someone is collected in order to keep track of a single user, regardless of the connection between that data and the intended use. As an example, some retail stores manage loyalty programs using customers' telephone numbers as a lookup value, meaning that the customer must provide their telephone numbers in order to accrue loyalty points. The store might never use the telephone number to place a call to the customer, and arguably has no need for the telephone number itself. Other organizations may use email addresses or other personally identifiable information for the same purpose.

Of course, a common alternative to such overly intrusive methods is to generate a unique key-code combination for each use (i.e., a unique username and password). But, as has also been well-studied, such username/password proliferation can pose its own set of problems for consumers, as multiple unique combinations are difficult to remember accurately. As a result, many consumers use insecure passwords (e.g., "Password1"), or use a single password for multiple accounts. Such approaches can result in significant security risks, especially when personally identifiable data, financial data, and/or other sensitive information are protected by such passwords.

Protecting consumer data is thus a complex and potentially very expense task for organizations that wish to benefit from data collection. For instance, in 2018, Forbes reported that the US companies on the Fortune 500 list had spent nearly $8 billion USD to comply with the European General Data Protection Regulation (GDPR). Moreover, many organizations, such as Google LLC, have recently blocked or have begun to block conventional data collection mechanisms such as third-party cookies. Further, centralized data storage tends to result in large processing loads and lengthy processing times, as substantial amounts of data must often be uploaded/downloaded. There are thus clear advantages to systems that provide the benefits of data collection to organizations without requiring the organizations to collect, manage, or secure that data.

Additionally, such systems would provide significant benefits to consumers by affording them greater control over, and awareness of, the data and personal information that they are sharing with an organization.

Accordingly, there is a need for systems and methods that provide consumer users with greater control over their own data, and with greater anonymity and security, while also allowing organizations to benefit from the existence of that data.

SUMMARY

This document discloses a system and method for distributed management of consumer data. The system verifies anonymized credential objects that represent consumer experiences/interests/preferences/etc. Credential schema data outlining desired attributes of a specific credential is provided by an organization user and is written to a distributed ledger. In response to a request from a consumer user's computing device, a credential delivery device delivers available credential object(s) to that user's computing device. A credential verification device subsequently receives a verification request from the computing device and prompts the creation of a response value (related to the credential's desired attributes) on the consumer user's computing device. If the response value conforms to requirements derived from the credential schema data, a first result is prompted; otherwise, a second result is prompted. The response value can be a zero-knowledge-proof (ZKP): i.e., the response value contains no consumer data or credential schema data. Delivery and verification can be performed using Bluetooth (BT), Bluetooth Low Energy (BLE), near field communications (NFC), QR codes, and any other suitable method(s).

In a first aspect, this document discloses a system for distributed management of consumer data, the system comprising: a server for: receiving credential schema data from an organization user, said organization user being affiliated with an organization and said credential schema data comprising desired attributes of a specific credential, wherein said specific credential relates to said consumer data; writing said credential schema to a distributed ledger; receiving result data from said organization user, wherein said result data relate to at least a first result associated with said specific credential and a second result associated with said specific credential; and writing said result data to a database; and a credential delivery device for: delivering a credential object to a computing device used by a consumer user in response to a first request from said computing device, said credential object being associated with said specific credential; wherein said credential object is verified by a credential verification device, and wherein: said distributed ledger is accessed by said credential verification device such that said credential schema data is accessed by said credential verification device, wherein said credential verification device accesses said distributed ledger in response to a subsequent verification request from said computing device used by said consumer user; said computing device used by said consumer user generates a response value based on an assessment of said consumer data and said credential schema data, said response value being devoid of any data from said consumer data and credential schema data; said response value is passed to said credential verification device; and said response value is analyzed by said credential verification device to determine whether said response value conforms to at least part of said credential schema data, wherein, when said response value conforms to said at least part of said credential schema data, a first result is prompted by said credential verification device, and wherein, when said response value is non-conformant to said at least part of said credential schema data, a second result is prompted by said credential verification device.

In another embodiment, this document discloses a system wherein said response value is encrypted.

In another embodiment, this document discloses a system further comprising a design interface in communication with said server for enabling said organization user to create said credential schema data and said result data and for enabling said organization user to upload said credential schema data and said result data to said server.

In another embodiment, this document discloses a system wherein said design interface is customized to said organization.

In another embodiment, this document discloses a system wherein said server receives result data from said organization user, wherein said result data relate to at least said first result and said second result, and wherein said server is further for writing said result data to a database.

In another embodiment, this document discloses a system wherein at least one of said desired attributes relates to at least one of: a completion of a purchase by said consumer user; an indication of a preference by said consumer user; a completion of an experience by said consumer user; an indication of an interest by said consumer user.

In another embodiment, this document discloses a system wherein said credential delivery device prompts said consumer user to accept said credential object on said computing device.

In another embodiment, this document discloses a system further comprising a second interface for use on said computing device, wherein said second interface enables said consumer user to review and modify credential objects on said computing device.

In another embodiment, this document discloses a system wherein a modification of a credential object comprises at least one of: a deletion of said credential object from said computing device and a temporary disabling of said credential object.

In another embodiment, this document discloses a system wherein said first request, said delivery of said credential object, said subsequent verification request, and delivery of said first result and said second result are conducted using at least one of Near Field Communication (NFC), Bluetooth (BT), and Bluetooth Low Energy (BLE).

In another embodiment, this document discloses a system wherein multiple organizations direct credential delivery devices to deliver credential objects based on a single credential schema.

In another embodiment, this document discloses a system wherein said credential delivery device and said credential verification device comprise a single physical unit.

In another embodiment, this document discloses a system wherein said credential delivery device and said credential verification device are located in a retail store.

In another embodiment, this document discloses a system wherein said organization user shares said credential schema data with at least one other user.

In another embodiment, this document discloses a system wherein said system accesses multiple distributed ledgers.

In another embodiment, this document discloses a system wherein said response value is based on biometric data of said consumer user.

In another embodiment, this document discloses a system wherein said system comprises said credential verification device.

In a second aspect, this document discloses a method for distributed management of consumer data, said method comprising the steps of: receiving credential schema data and result data from an organization user, said organization user being affiliated with an organization, said credential schema data comprising attributes of a specific credential, and said result data relating to at least a first result associated with said specific credential and a second result associated with said specific credential; writing said credential schema data to a distributed ledger; writing said result data to a database; receiving, from a computing device used by a consumer user, a first request; and delivering a credential object to said computing device in response to said first request.

In another embodiment, this document discloses a method further comprising the steps of: receiving a subsequent verification request from said computing device; accessing said distributed ledger in response to said subsequent verification request to thereby access said credential schema data; prompting said computing device used by said consumer user to generate a response value based on said consumer data and said credential schema data; receiving said response value from said computing device used by said consumer user; and analyzing said response value to determine whether said desired attributes are satisfied by said consumer data, when said response value indicates that said desired attributes are satisfied by said consumer data, passing a first result to said computing device; and when said response value indicates that said desired attributes are unsatisfied by said consumer data, passing a second result to said computing device.

In another embodiment, this document discloses a method further comprising the steps of: receiving result data from said organization user, said result data relating to at least a first result and a second result, said first result and said second result being associated with said specific credential; and writing said result data to a database.

In another embodiment, this document discloses a method wherein at least one of said desired attributes relates to at least one of: a completion of a purchase by said consumer user; an indication of a preference by said consumer user; a completion of an experience by said consumer user; an indication of an interest by said consumer user.

In another embodiment, this document discloses a method further comprising the step of prompting said consumer user to accept said credential object on said computing device.

In another embodiment, this document discloses a method wherein said credential object on said computing device is reviewable and modifiable by said consumer user.

In another embodiment, this document discloses a method wherein a modification of said credential object includes at least one of: a deletion of said credential object from said computing device and a temporary disabling of said credential object.

In another embodiment, this document discloses a method wherein said response value is encrypted.

In another embodiment, this document discloses a method wherein said delivering is performed after a biometric authentication process is successful.

BRIEF DESCRIPTION OF THE DRAWINGS

The present invention will now be described by reference to the following figures, in which identical reference numerals refer to identical elements and in which.

DETAILED DESCRIPTION

Figure 1:
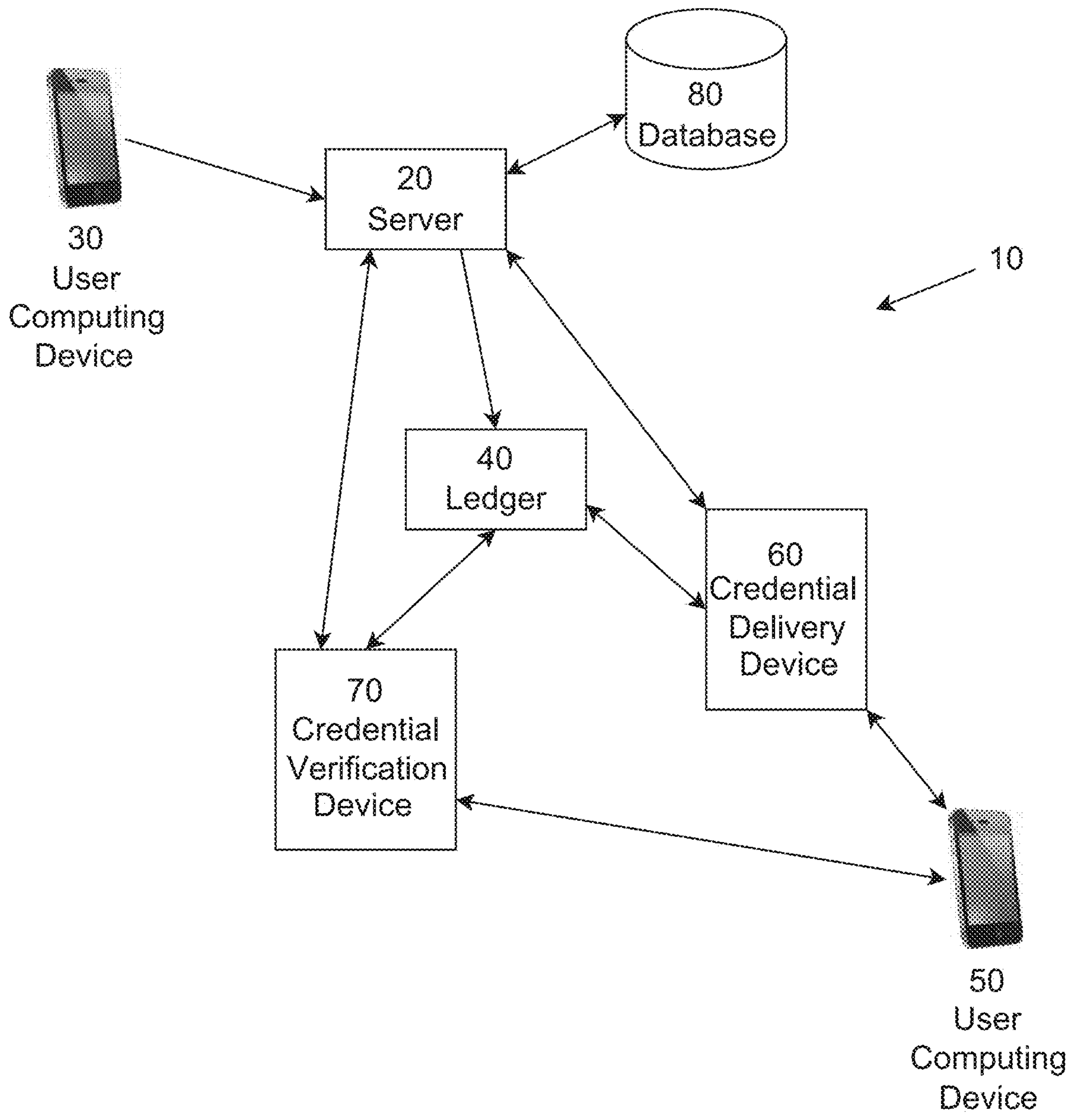
FIG. 1 is a block diagram illustrating a system according to one aspect of the invention.

The present invention discloses a system and method for the distributed management of consumer data via "credential objects" stored on a consumer user's computing device. Credential objects are associated with credentials determined by an organization, which can be related to a previous purchase by the consumer user, to a previous experience of the consumer user, and/or to a previous interest or preference of the consumer user. The credential objects are delivered to the consumer user's device at the consumer user's request. "Credential schema data" outlining desired attributes of each specific credential (i.e., what must be satisfied when the credential is evaluated) are stored on a distributed ledger. The consumer user can then present the credential object for verification. A response value related to the consumer user's consumer data and to the credential schema data is then created on the consumer user's device and passed to the credential verification device. In a preferred embodiment, the response value contains no personally identifiable information or information that is extraneous to the requirements of the response value. Further, the consumer data itself does not leave the consumer user's device. The credential verification devices analyzes the response value to determine whether the response value conforms to at least a part of the credential schema data (i.e., whether the response value indicates that the desired attributes for the specific credential are satisfied and, thus, whether the credential is valid). A result based on that response value is then prompted—for instance, if the credential object relates to a previous purchase of a meal, the consumer user can be prompted to order that meal again.

Consumer data, as should be clear, is a very broad category of data encompassing any and all data related to an individual consumer user. This can include, without limitation, data related to the user's experiences, tasks, interests, preferences, activities, purchases and other transactions, relationships, and/or demographics. Further, consumer data can take any suitable form, including, without limitation, text data, numeric data, machine-readable data, sensor data from internal sensors on consumer devices (e.g., data from the accelerometer on a smart phone), audio data, visual data (e.g., images), audiovisual data (e.g., videos), and other multi-dimensional forms of data. As would be understood by the person skilled in the art, however, complex forms of data (e.g., videos) may be comparatively more difficult to use than simpler forms (e.g., text or alphanumeric strings). The organization user can determine, while designing the credentials and inputting credential schema data, what consumer data should be evaluated and how that data should be assessed.

The credential schema data, similarly, can comprise any suitable form of data. As will be discussed below, credential schema data can be directly input by the organization user as text data (including natural language, computer code, and/or other forms of text), or can be generated by the organization user using a graphical user interface (GUI) or other interface, or can be based at least in part on templates. Other input and uploading methods, as may be known to the person skilled in the art, should be understood as falling within the scope of this invention.

Referring now to FIG. 1, a block diagram illustrates a system according to one aspect of the invention. A server 20 in the system 10 receives credential schema data from an organization user using computing device 30. As noted above, the credential schema data includes requirements that must be satisfied to obtain the credential. The server 20 writes the credential schema data to a distributed ledger 40. The credential schema data, once added to the ledger 40, is available for use.

In some embodiments, other information related to the credential(s), such as (without limitation): results/outcomes when the credential is verified or not verified, and/or details of the devices that can deliver and/or verify the credential(s), are passed to the server 20 from the organization user's computing device 30 and stored in a database 80. Such information can be easily modified by the organization user and modifications propagated to all connected delivery/verification devices, as may be suitable for a specific implementation.

As would be clear, depending on the embodiment, the server 20 can have any suitable architecture. For instance, in one embodiment, the server 20 is a locally hosted server maintained by an organization issuing credentials. However, in a preferable embodiment, the server 20 is remote and/or distributed (e.g., 'cloud-based') and externally maintained.

A consumer user, using a computing device 50, then requests the delivery of a credential object. Specifically, the consumer user's computing device 50 passes a request to a credential delivery device 60. This request indicates what credential is being sought (if that is known in advance), or merely indicates that a credential is being sought. The credential delivery device 60 then delivers any available credential object to the computing device 50.

Subsequently, the consumer user presents their credential for verification. As an example, the consumer user might have previously collected a credential object that would entitle them to a discount on a current purchase, if they had a made a previous purchase. The consumer user thus directs their computing device 50 to pass a verification request to a credential verification device 70. In one embodiment, the request includes a list of all credential objects on the user computing device 50, while in other embodiments, the request merely indicates that one or more credentials is stored on the computing device 50.

In response to the request from the computing device 50, the credential verification device 70 accesses any relevant credential schema data on the distributed ledger 40 and prompts the computing device 50 to generate a 'response value'/'proof' based on an assessment of that credential schema data and consumer data stored on the computing device 50. In a preferred embodiment, the response value is an encrypted data value that indicates whether the consumer data satisfies the desired attributes of the credential according to the credential schema data, but contains no unnecessary information. This may be termed a "zero-knowledge proof" (ZKP)—that is, no extraneous details about the consumer data are contained in the response value. In particular, the response value is devoid of any and all consumer data, and also of any credential schema data. Such ZKPs are highly anonymized and thus highly protective of user privacy. As an example, if a desired attribute of a certain credential is that the credential holder be over 18, the response value would not indicate the credential holder's actual age or birthdate, merely that they 'are' or 'are not' over 18. The response value can be represented by numerical and/or binary data, Boolean data, text data, or any other suitable kind of data.

As would be clear to the person skilled in the art, any suitable method for generating such a response value/proof may be used. The response value/proof can be created/evaluated by any mechanism capable of cryptographically proving that a consumer user owns/holds credentials that match desired criteria/desired attributes without transmitting the credential or actual value(s) for the desired attribute(s). In one embodiment, the well-known Hyperledger implementation of anonymous credentials is used to generate Camenisch-Lysyanskaya (CL) signatures based on a secret value shared between holder and issuer, and negotiated for each credential, as the means of proving credential ownership to third party verifiers. Of course, many other signature types are possible, and the person skilled in the art would understand how to adjust the invention to accommodate such different signature types. Additionally, as should be understood, in preferable embodiments of the invention, it is not necessary for the organization user to have a detailed understanding of the cryptographic mechanism used to generate/evaluate the proof/response value. Rather, preferable embodiments can provide, e.g., a node-based graphical user interface to enable the organization user to "draw" (i.e., visually map) the relationship between proofs and credentials, and/or include drop-down components or similar features that allow organization users to select from the set of available attributes for a given credential, and to then specify any conditions that should be tested. Other user-friendly embodiments can include wizard/survey style interfaces. However, of course, any suitable interface may be used in a given embodiment.

The response value is then passed from the user's computing device 50 to the credential verification device 70. The credential verification device 70 analyzes the response value against the credential schema data to determine whether the response value conforms to at least a part of the credential schema data (i.e., whether the proof is 'true' or 'false'). If the response value conforms to the at least part of the credential schema data, then the proof is 'true' (meaning the desired attributes of the specific credential(s) were satisfied), and the credential is valid. If the response value is non-conformant with the at least part of the credential schema data, then the proof is 'false' (meaning the desired attributes of the specific credential(s) were unsatisfied), and the credential is invalid.

When the credential is valid, a first (positive) result associated with that credential object is prompted. On the other hand, when the credential is invalid, a second (negative) result associated with that credential object is prompted. The first and second results are determined by the organization user and stored in the database 80, as described above.

The database 80 can comprise any conventional database, such as a database based on SQL, mySQL, and/or other common database language(s), or can comprise a database based on a purpose-built/proprietary system. Positive results can be any desired outcome (e.g., updating a loyalty status, providing a discount, etc.). Negative results can include null results (i.e., doing nothing) or prompting the display of a message to the consumer user via the computing device 50 (e.g., a simple message such as "[Credential X] not found", a motivational message such as "Almost there!", or other messages). Other positive and negative results are, of course, possible, depending on the organization's configuration of the relevant credential schema. Additionally, in some embodiments, some organizations may wish to offer 'multi-step credentials' or credentials with multiple levels (e.g., a single credential to reward different tiers of a loyalty program). In such scenarios, intermediary results or results for the different levels may be created by the organization user.

Distributed ledgers such as the ledger 40 are well-known in the art and are consensus-based data structures that are replicated across multiple nodes in a network. The reliance on consensus means that, in a robust ledger system, retroactively modifying of ledger entries is extremely difficult. The credential schema data is thus effectively immutable so long as the distributed ledger 40 is maintained. Thus, the organization user will not be able to modify or remove a specific credential schema from the ledger 40. However, in preferable implementations, each credential schema data entry recorded on the ledger 40 is associated with a unique cryptographic key. Should the organization user need to modify that credential schema data, a new record with the same cryptographic key would be added further down the ledger and would over-ride the previous record.

It should of course be noted that, although the use of a distributed ledger is preferable, alternative storage mechanisms for the credential schema data may in some embodiments be used. For instance, in some embodiments, the credential schema data can be stored in a conventional database, such as a locally hosted, remote, or cloud-based database. As would be clear, any system or data structure for managing and/or storing data may be used in place of the distributed ledger, provided the system permits sufficient access to the credential schema data, as described herein.

The organization user is associated with an organization, which may be a for-profit, not-for-profit, non-profit, and/or any other organization for which the present invention is suitable. That is, the organization may be any organization that collects, processes, and/or stores consumer data, or that believes such data could be useful. Similarly, the organization user may be any representative of the organization, such as a CEO or other officer, an employee or contractor, or an associated agent (such as a marketing consultant). Typically, the organization user would be a marketing and/or advertising professional in some way associated with the organization. However, as should be clear, an organization can determine its own authorized representatives based on its own preferences and needs.

Computing device 30 may be any kind of computing device, including a desktop or laptop computer, a tablet, a smart phone, or other device suitable for communicating with the server 20. In some embodiments, the organization user may write the credential schema data in a programming language, using a text editor, integrated development environment (IDE) for that programming language, or any other tool. In other embodiments, a design interface is provided. The design interface allows the organization user to create credential schema, modify credential schema, and manage the delivery of credential objects according to the schema. In some implementations, the design interface can be fairly minimal and may require the organization user to do substantial programming/coding work, while in other implementations, the design interface can be substantially or fully graphical and may require little to no programming by the organization user.

Further, in a preferred embodiment, a single interface for designing credentials is used to upload the credential schema data, as well as result data (relating to the first and second results, and to any other desired results) and information regarding how the credential object is to be delivered (e.g., what kind of delivery device should be used). The credential schema data, the result data and the delivery information could all be entered in the single system/design interface and passed together to the server 20. The server 20 would then write the credential schema data to the distributed ledger 40 and write the result data and the delivery information to the database 80. The server 20 can then communicate with any/each credential delivery device 60, regarding the credentials that are available to that specific credential delivery device 60. Similarly, the server 20 can communicate with any/each credential verification device 70, regarding the appropriate result when a response value is evaluated.

For instance, a treadmill could be outfitted as a credential delivery device. The treadmill would directly deliver one or more available credential object(s) to a computing device 50 of the treadmill's user. As should be clear, a given credential delivery device 60 can be used to deliver many different credential objects in response to different requests from users. In the treadmill example, different credentials could represent different distances, times, and/or average speeds, or combinations of any such factors, as well as any other criteria that the organization chooses to recognize.

Further, the credential may relate solely to preferences, rather than to completed experiences, purchases, or tasks. As an example, a consumer might prefer an aisle seat on an airplane, rather than a window seat. In such a case, the credential's desired attributes would outline the following requirement: "Has the consumer user indicated a preference for an aisle seat?" If the consumer user has previously indicated such a preference, the verification device would determine that the consumer has a verified "aisle-seat preference" credential object. Clearly, where multiple potentially preferred alternatives exist, it can be beneficial for the organization to create credential schema data for each possible alternative (e.g., separate and mutually exclusive credentials could exist for "aisle-seat preference", "window-seat preference", and, where relevant, "middle-seat preference"). Further, credentials that account for ranked preferences may also exist (e.g., "aisle seat is preferable to window seat, but either is preferable to middle seat"). Additionally, in some embodiments, if the consumer has not indicated a preference for a specific alternative related to a preference-based credential, the credential delivery device 60 is configured to prompt the user to indicate their preference. The specific configuration of credentials, of course, can be determined by the organization and/or the organization user, based on their goals and specific circumstances.

It should thus be clear that the credential delivery device 60 can be any device configured to deliver a credential object. This can include, without limitation, point of sale devices, single-purpose credential delivery kiosks, and multi-purpose devices or devices for which credential delivery is not the primary purpose (e.g., the treadmill in the example above). Such devices can be retrofitted as credential delivery devices or can be initially designed and produced with credential delivery capabilities.

Further, the delivery of credential objects can occur using any suitable method and/or protocol. In some implementations, wired connections may be required. However, in a preferable implementation, the consumer user's computing device 50 is a portable computing device, such as a smart phone, that is configured for wireless communication using a wireless protocol such as Near Field Communication (NFC), Bluetooth (BT), and Bluetooth Low Energy (BLE), and the credential delivery device is also configured to use the same protocol. Such protocols are commonly used to securely transfer payments, etc., over short distances, and require physical contact, or physical proximity between the communicating devices (i.e., "tapping" the devices together). Accordingly, in implementations using a wireless protocol that requires tapping, the consumer user would simply tap their computing device 50 against the credential delivery device 60. With other protocols, physical proximity may be sufficient. Other methods of communication/other communication protocols can of course be used, such as radio frequency identification (RFID) communication methods, QR-code-based protocols and methods, HTTP-based protocols and methods (which may be triggered by the scanning of a QR code or other link), and other data transfer/data communications methods and protocols. Of course, the credential verification device(s) 70 can similarly use any of these methods and/or protocols to communicate with the computing device 50. Note that the credential delivery device 60 and the credential verification device 70 are not required to use the same communication methods/protocols.

The response value is generated on the user's computing device 50 based on consumer data stored on that device 50 and the desired attributes associated with the credential (obtained by the credential verification device 70 from the distributed ledger 40). For instance, if the credential relates to a previous purchase of a specific good, and the purchase was made using a mobile wallet on the computing device 50, the response value passed to the credential verification device 70 would be that such a purchase was made using that computing device 50. However, the response value passed to the credential verification device 70 in this instance would not need to include the identity of the purchaser, the date, time, or location of the purchase, the contact information for the purchaser, or any information about any other purchases made using the mobile wallet.

As mentioned above, "partial credentials" or "multi-step credentials" may be created by some organizations. Such partial credentials are, in some embodiments, designed as multi-level credentials but actually represented by multiple separate credential objects, each having different desired attributes. Referring back to the treadmill example, an organization may wish to reward different distances run (e.g., 1K, 5K, 10K, etc.). Rather than designing a credential for each increment, it may be more efficient for the organization user to create a multi-step credential. A multi-leveled/multi-step credential object could then be delivered to the consumer user's device 50, or multiple credential objects could then be created, depending on the implementation.

Credential objects can be stored in a 'credential wallet' on the consumer user's computing device 50. In one embodiment, a single-purpose application is used to store credential objects for multiple organizations. In other embodiments, the credential wallet is a plug-in or interface that can be added to a pre-existing application in order to integrate the distributed consumer data management system with other applications. This plug-in style interface may be preferred by organizations that already have established applications and/or mobile apps, and can allow customization based on the organization's existing branding, look-and-feel, etc. Exemplary credential wallet interface screens are shown in FIGS. 2A, 2B, 2C, and 2D.

Figure 2A:
FIGS. 2A to 2D are screenshots of exemplary wallet applications for a consumer user's computing device.
Figure 2B:
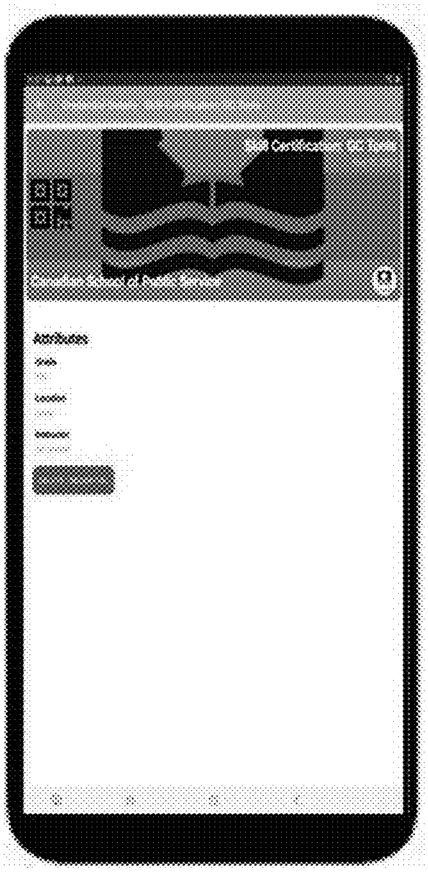
Figure 2C:
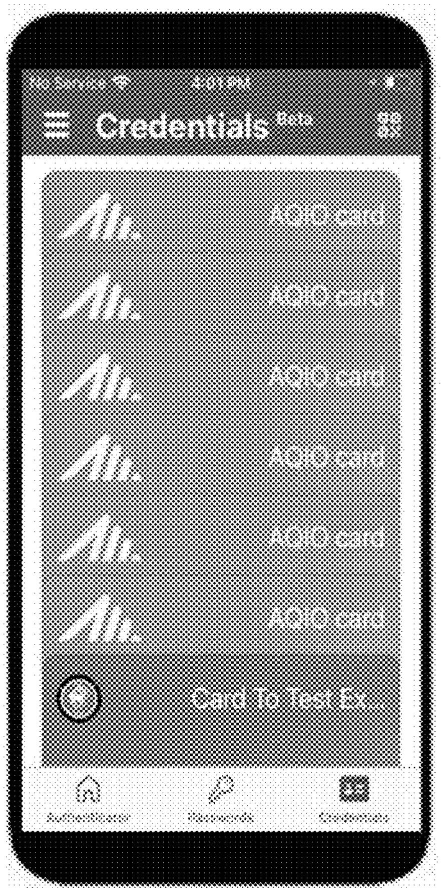
Figure 2D:
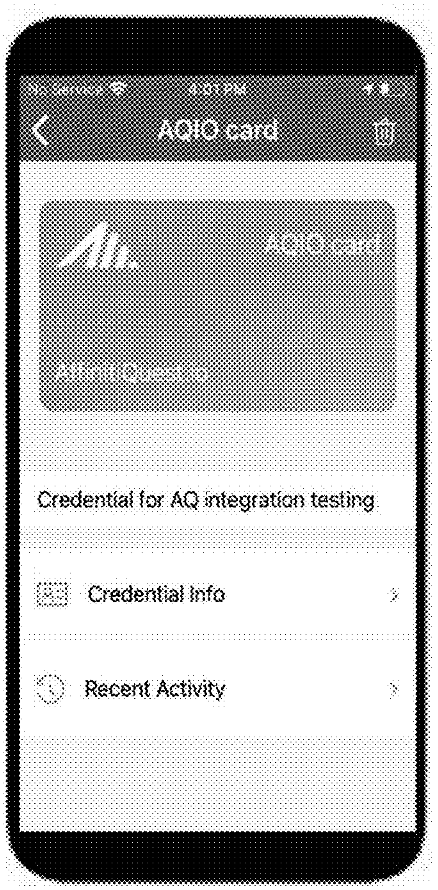

Many different identity wallet applications are currently known and in use in the art. For example, FIGS. 2A and 2B show a third-party wallet application interface, and FIGS. 2C and 2D show a different proprietary wallet application interface. As is known, each wallet application is typically associated with a separate ledger. As such, the system 10 is preferably configured to work with multiple ledgers and wallet applications; that is, to verify and/or issue credentials created according to multiple, differing standards. As would be understood, in an embodiment in which different wallet applications use a single ledger and distributed identity method (did:method), it would be possible to configure a single credential to be used in multiple wallet applications. That is, a single QR code or any other credential-issuance code or other delivery method would be presented by the delivery device for delivery to multiple users using different wallet applications. In further embodiments, a credential is issued in an interoperable format (i.e., is formatted such that it is suitable for use in multiple different ledgers). That is, in such embodiments, a credential that conforms to a specific standard is issued. Such a credential could be issued from a ledger to a wallet application not connected to that ledger, provided both the ledger and the wallet application support the standard credential format.

In one embodiment, the system 10 is configured to support multiple wallet applications using an extensible ledger connector approach. In this approach, wallet applications are mapped to their associated ledger through a common DID method string. This string is, in one embodiment, stored on the system's central ledger 40, while in other embodiments it is stored in other data storage modules, such as the database 80 or an external database. Users of wallet applications (i.e., the consumer users associated with devices 50) select their preferred wallet at the time of issuance and verification. Using the system 10, issuer and verifier organizations are thus able to support numerous wallet applications/ledgers.

Figure 3A:
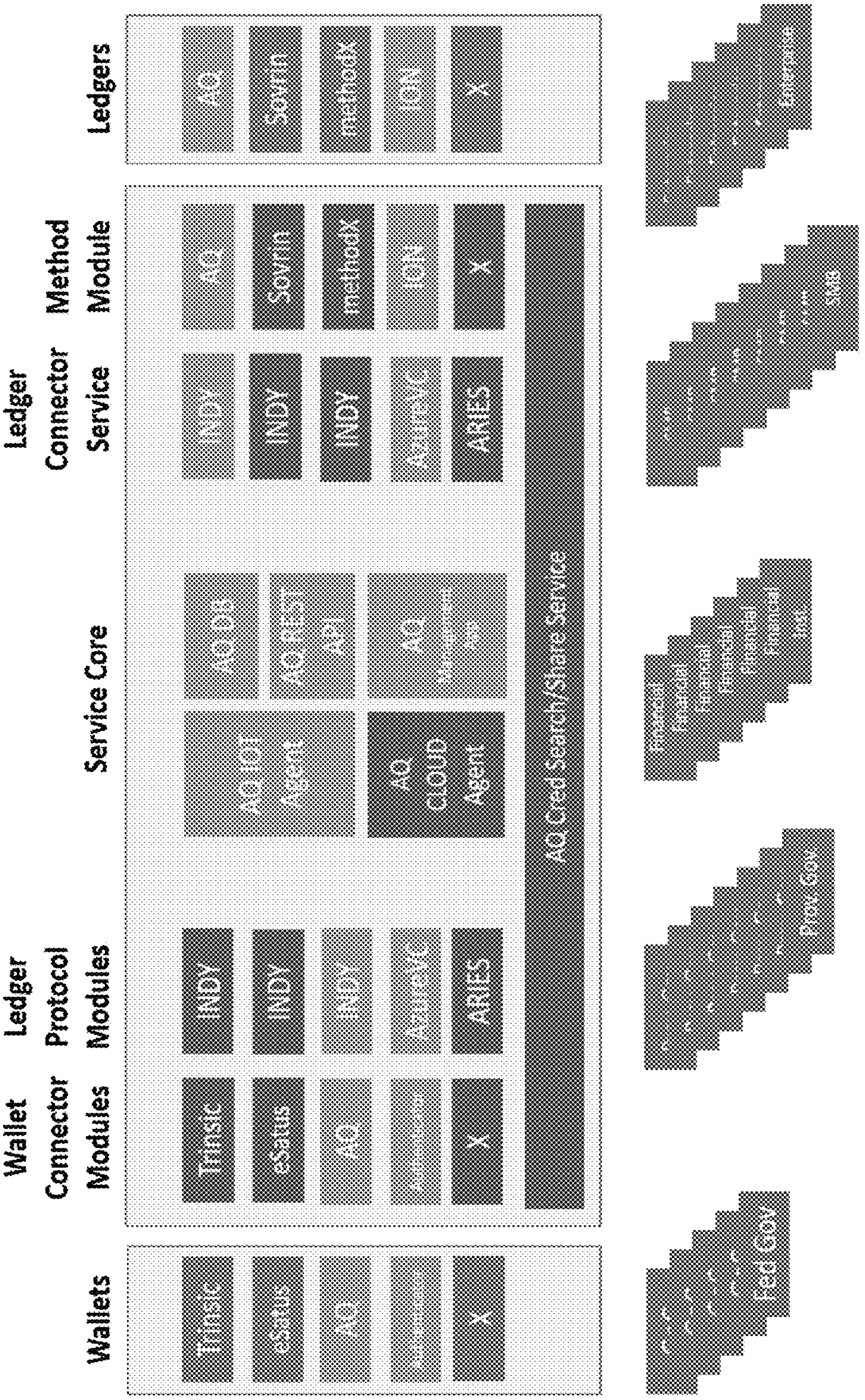
FIG. 3A is a schematic diagram of an exemplary multi-wallet/multi-ledger embodiment.

FIG. 3A shows a schematic diagram of an exemplary multi-wallet/multi-ledger embodiment. The Service Core section at the center of the schematic corresponds to the server 20 in the system 10. As can be seen at the right of the Service Core, the Service Core is in communication with numerous ledgers via numerous Ledger Connector Services, such as INDY™, AzureVC™, ARIES™ etc. As would be understood, the system 10 is not limited to those Ledger Connector Services and any suitable Ledger Connector Service can be implemented. Further, as is well-known, the Ledger Connector Service(s) may connect to any suitable ledger 40, including proprietary ledgers (e.g., AQ) and third-party ledgers (e.g., Sovrin™, Method™, ION™, X™, etc.), using any suitable connector method module. Similarly, on the left of the Service Core in this diagram, it can be seen that the Service Core is in communication with numerous third-party wallet applications via associated Ledger Protocol Modules. Wallet applications include, without limitation, third-party wallets such as Trinsic™, eSatus™, Authenticator™, and X™, as well as proprietary wallets and any other suitable wallet applications.

As indicated by the grey boxes at the bottom of the schematic in FIG. 3A, the multi-wallet/multi-ledger embodiment of the system 10 is accessible by numerous credential-issuing/credential-verifying organizations, such as government entities, financial institutions, Small and Medium Businesses (SMBs), and large enterprises, using whichever wallet/ledger combination they prefer.

Figure 3B:
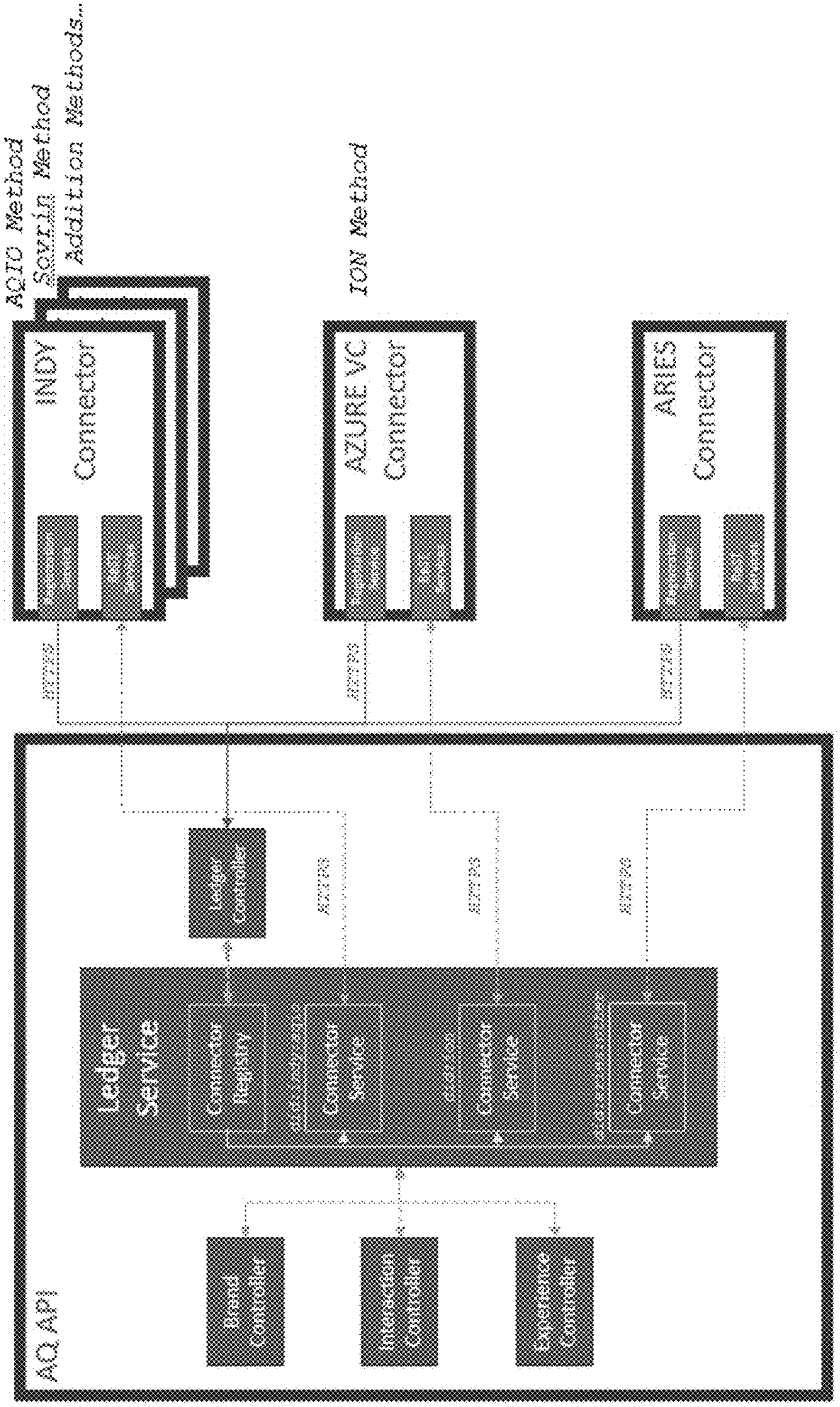
FIG. 3B is a protocol diagram for implementing the multi-wallet/multi-ledger embodiment shown in FIG. 3A.

FIG. 3B shows a protocol diagram for implementing the multi-wallet/multi-ledger embodiment shown in FIG. 3A. As shown, a proprietary Application Programming Interface (API) is established (shown at left) to connect the system 10 to multiple Ledger Connector Services (shown at right). A registry of all connected ledgers is also maintained in the system 10.

Figure 4:
FIG. 4 shows an exemplary graphical user interface for issuing a credential in a multi-wallet/multi-ledger embodiment.

FIG. 4 shows an exemplary graphical user interface for issuing a credential in such a multi-wallet/multi-ledger embodiment. A QR code for scanning by the consumer user's computing device 50 is shown. In this example, when scanned, the QR code would trigger a delivery process for an Ontario driver's license. Underneath the QR code, icons for multiple wallet applications are shown. The issuer can select which application(s) the credential object should be available to. Note that, in all screenshots included herein, all brands, credentials, credential objects, wallet applications, etc., are mock-ups, fictional, or merely included as examples and are not intended to limit the scope of the invention or to suggest any relationship between, or approval or endorsement of or by, any parties.

In some embodiments, the consumer user is able to review, modify, and control which credential objects are stored on their computing device 50. Modification of a credential object can include permanently deleting the credential object from the computing device 50 or temporarily disabling the credential object (i.e., 'hiding' the credential object so that credential verification devices 70 do not recognize its presence). Additionally, in some cases, it may be preferable to require the consumer user's explicit permission for delivery of a credential object. For instance, the consumer user can be asked to explicitly accept delivery of each new credential object added to their computing device 50. In other embodiments, the consumer user can change permission settings to always allow credential objects (i.e., without explicitly receiving permission for each separate credential), or to allow credential objects from one or more specific organizations without explicit permission.

In some embodiments, a credential verification device can only verify one specific credential. This may be useful in implementations where many people will be verifying similar information (e.g., verifying entry tickets at a large event). However, in other embodiments, it may be preferable for the credential verification device to be able to verify many different credentials. For instance, it may be desirable for a credential verification device installed in a retail store operated by an organization to be able to verify any and all credentials managed by that organization. In other embodiments, moreover, a credential verification device may be configured to verify any credential, regardless of the issuing organization of the credential. This could be useful in common areas of high-traffic locations (e.g., shopping malls or mass transit stations). Such configurations can be managed by the organization user in communication with the server 20.

Further, in some embodiments, more than one organization can use a single credential. That is, in some embodiments, the distributed ledger 40 is publicly visible and the requirements and results for any particular credential may be seen by external parties. Thus, if one organization sees a benefit to a credential developed by another organization, the first organization can use the associated credential schema for its own purposes. Of course, depending on the level of detail of the credential schema data, direct reuse may be impractical. Additionally, in some embodiments, organizations may prefer not to publicly reveal their credential schema or provide same for others' use. In such embodiments, all credential schema data can be encrypted by any suitable method before being written to the ledger, and only made visible to/decrypted for authorized users from the associated organization (or, of course, anyone providing the encryption key). Alternatively, specific entries on the ledger may be encrypted while other entries on the ledger are not.

Figure 5:
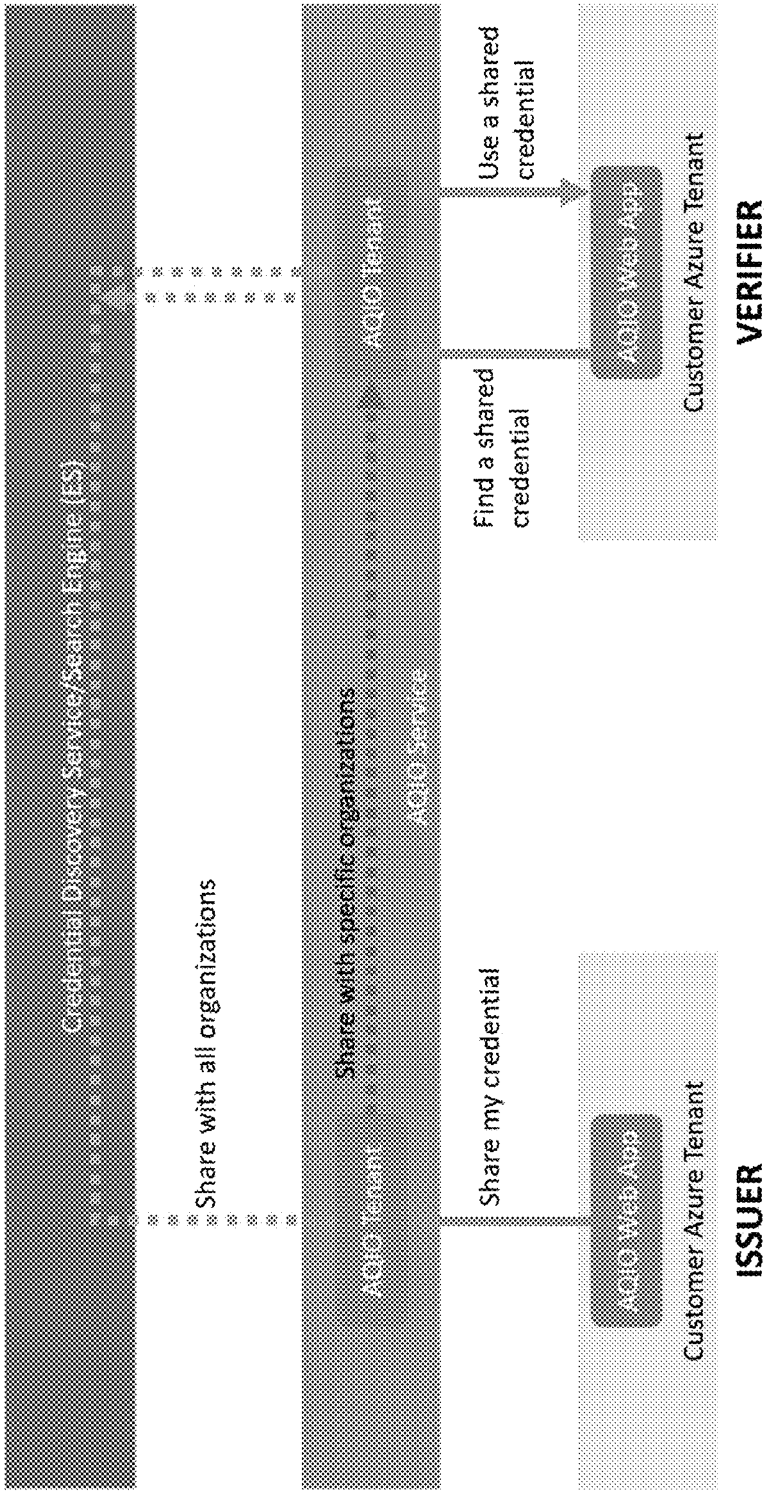
FIG. 5 is a schematic diagram illustrating a method of credential schema sharing between users.
Figure 6:
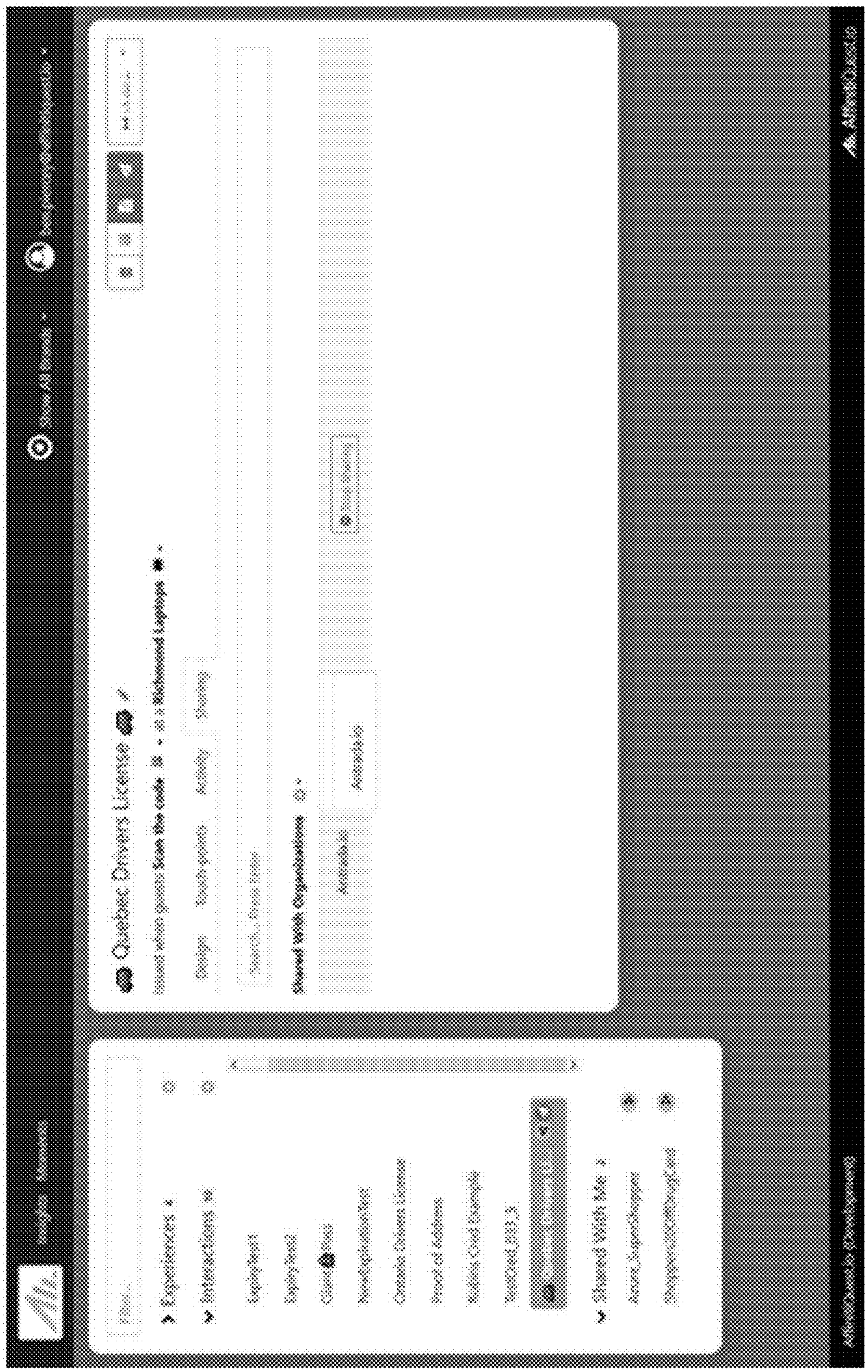
FIG. 6 shows an exemplary graphical user interface for credential schema sharing.
Figure 7A:
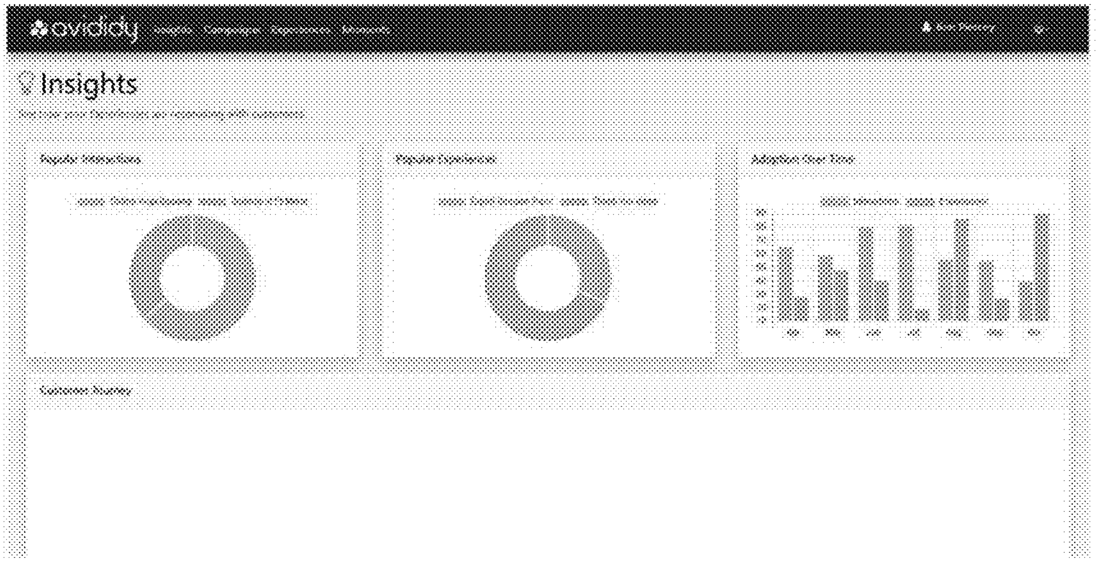
FIG. 7A is a screenshot of a dashboard of an exemplary design interface according to an implementation of the invention.
Figure 7B:
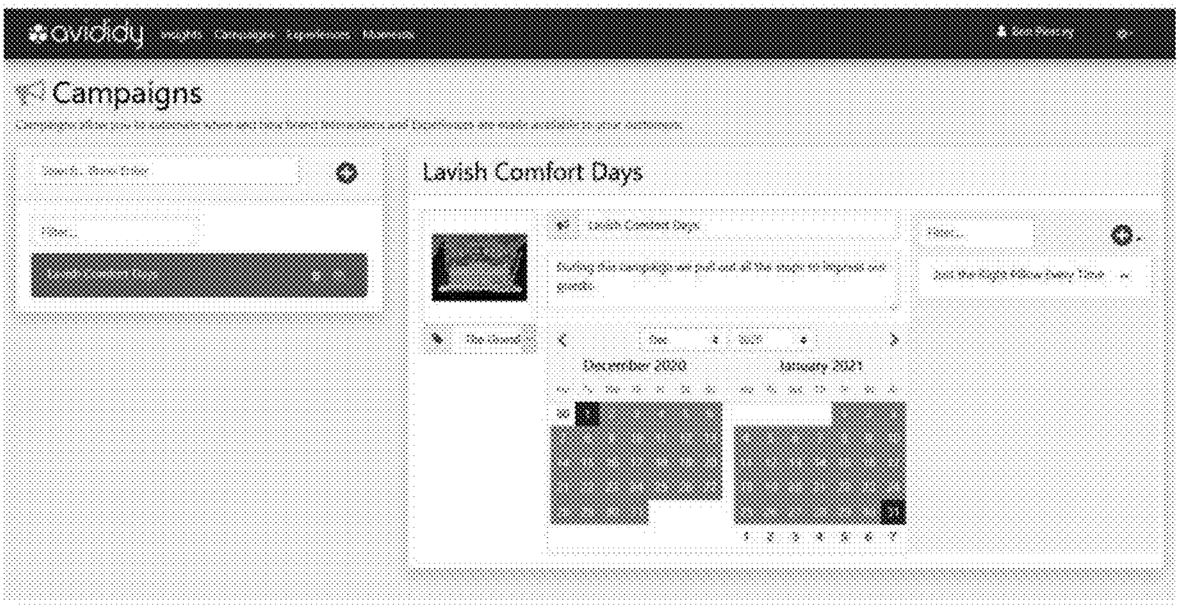
FIG. 7B is a screenshot of a scheduling interface according to the implementation of FIG. 7A.
Figure 7C:
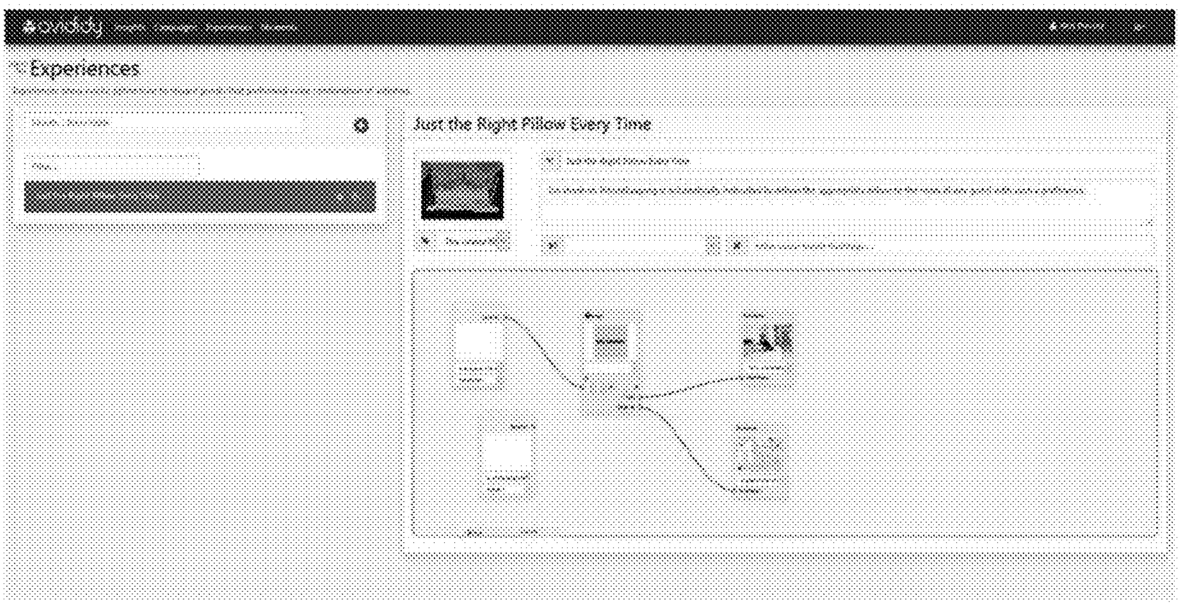
FIG. 7C is a screenshot of a credential design interface according to the implementation of FIG. 7A.
Figure 7D:
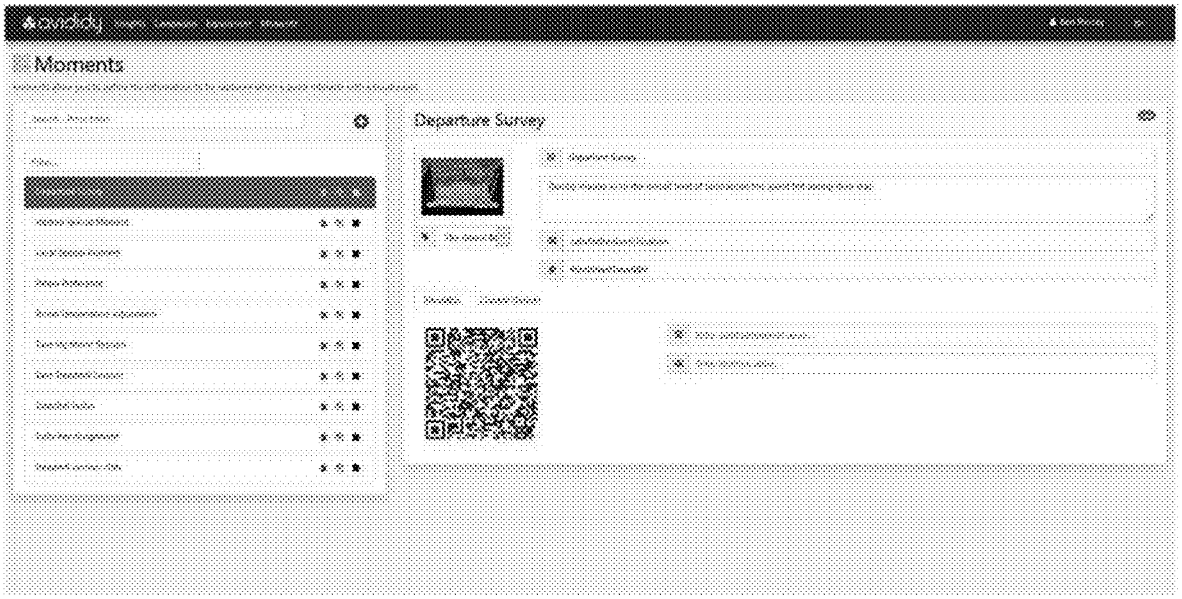
FIG. 7D is another screenshot of the credential design interface of FIG. 7C.
Figure 7E:
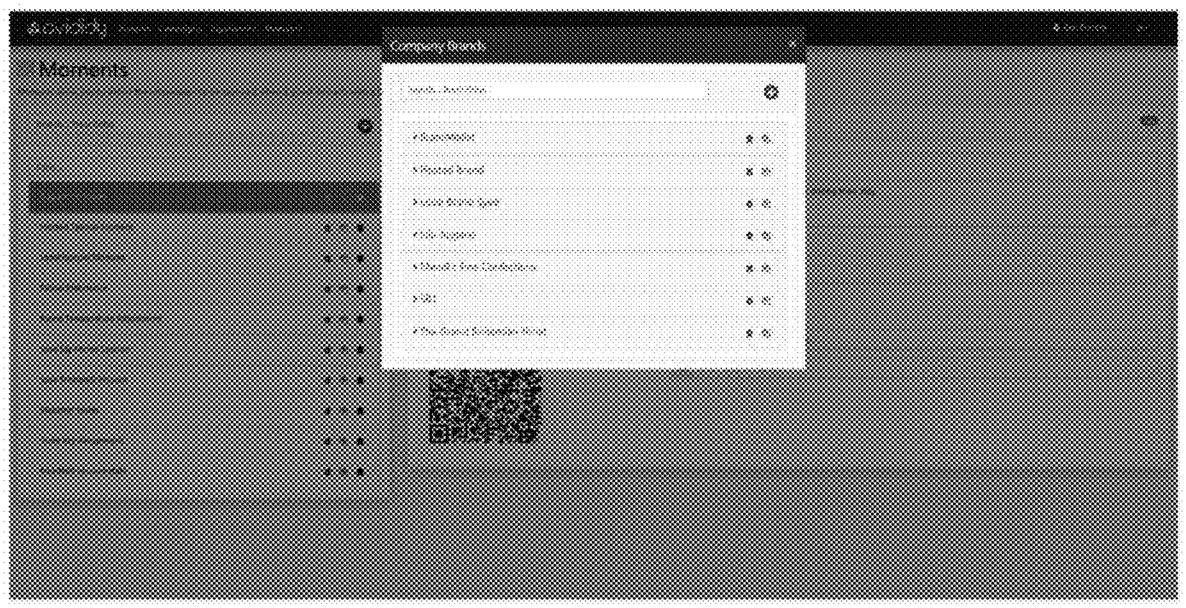
FIG. 7E is another screenshot of the credential design interface of FIG. 7C.
Figure 7F:
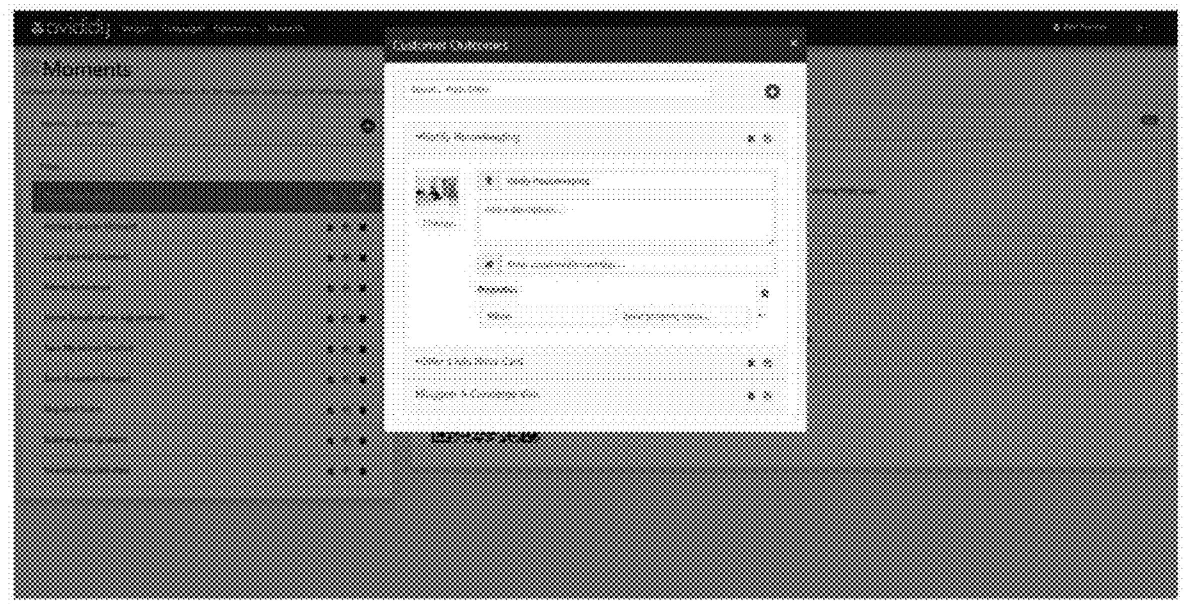
FIG. 7F is another screenshot of the credential design interface of FIG. 7C.
Figure 7G:
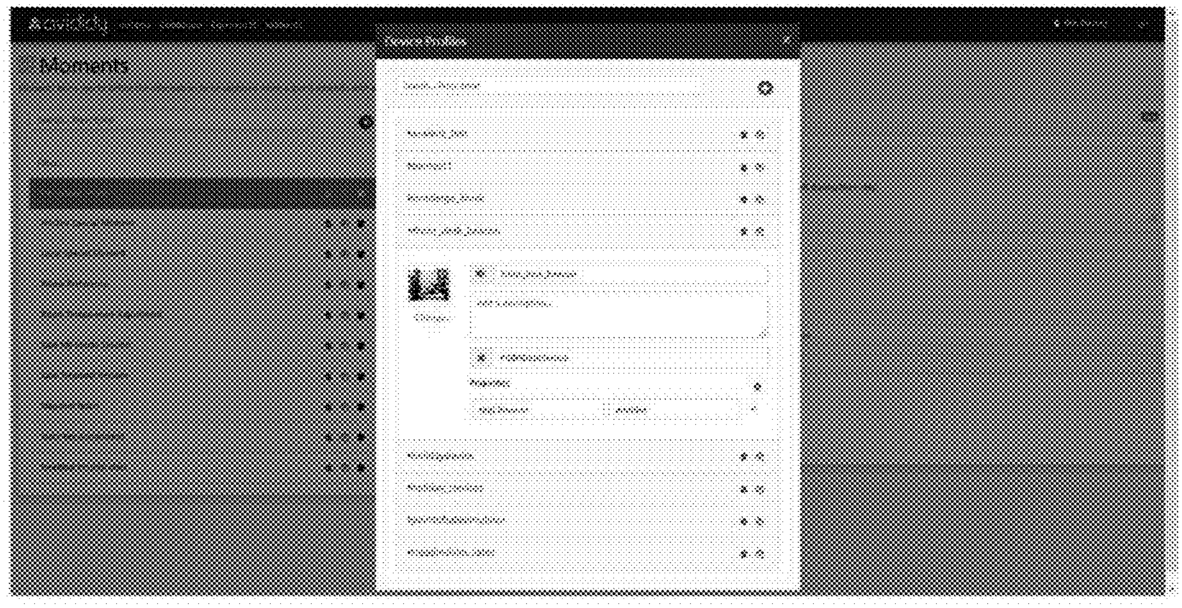
FIG. 7G is a screenshot of a device management interface according to the implementation of FIG. 7A.

In some embodiments, the system permits the credential-issuing organization to share credentials with other organizations. That is, rather than having to locate specific, individual credential schemas (which are currently difficult to locate) or create its own credential schemas, an organization receives credential schema data from another organization. FIG. 5 is a schematic diagram illustrating such a sharing method. When creating a credential, the issuer chooses whether to share the associated credential schema with other organizations. In some embodiments, the credential schema is shared directly with one or more specific other organizations chosen directly by the issuer user. In other embodiments, the issuing user makes the credential schema available to all other organizations (i.e., potential issuers) that have access to the system 10. For example, a government entity could share a driver's license credential schema with all organizations so that any organization can easily access a schema for verifying a consumer user's age. The verifying organization can then use the shared credential schema. FIG. 6 shows an exemplary graphical user interface for such credential sharing.

Further, in some embodiments, a search interface allows a verifying user to conduct text searches for credential schemas that have been shared with them or that are globally available. Such a search interface substantially reduces the time and difficulty of finding credentials for verifying desired attributes.

In one embodiment, further, the credential design interface includes or accesses an additional template database comprising credential schema templates. These can be developed by the organization user or by system administrators, and/or shared between different organization users. Such templates can relate to common actions/results (e.g., 'receive a free coffee after 10 purchases') and can accelerate the credential schema process, as they would require only minor customizations.

In some embodiments, the credential delivery device 60 and the credential verification device 70 are separate units. However, in other embodiments, the credential delivery device 60 and the credential verification device 70 are formed as a single unit, or a single hardware unit may be configured to perform either function in response to an appropriate request. For instance, a point-of-sale (POS) terminal may be configured to deliver credentials upon purchase of qualifying goods and to automatically apply a discount as the result of a verified credential.

In some embodiments, credential delivery devices and/or credential verification devices can be automatically configured to deliver and/or verify credentials. Further, all devices within a certain category of devices can be configured to operate in the same ways. That is, specific credentials would not have to be associated with each individual device through the design interface (which could easily become tedious and error-prone). Rather, credentials can be associated with categories of devices (e.g., with all point-of-sale devices operated by the organization). Such automatic configuration enables easier scaling of the distributed consumer data management system.

Preferably, each device generates an associated "Device ID" that is unique to that specific device and that is based on characteristics of the hardware, firmware, operating system, etc. of the device. The Device ID can then be matched with a suitable "device profile"—i.e., matched with a group of similar devices. As an example, if a new treadmill were to be added to the system, a Device ID for that treadmill would be generated that represented various characteristics and hardware/firmware specifications of the treadmill. The Device ID would be sent to the server 20 and compared to other Device IDs. Based on the results of that comparison, the device would be assigned a device profile as a 'treadmill'. As would be clear to the person skilled in the art, the device profile can have any desired level of granularity. For instance, for some organizations, a single 'treadmill' category may be sufficient. However, another organization may wish to offer different credentials through treadmills at different locations. Accordingly, the categories for that organization could be of the form 'treadmill at location A', 'treadmill at location B', etc.

Turning now to FIGS. 7A to 7G, images of an exemplary design interface according to one implementation of the invention are shown. This design interface is primarily graphical, enabling an organization user to create credential schema data without detailed coding. However, the organization user may add text and/or images, as well as other kinds of relevant data.

Figure 8A:
FIG. 8A is a screenshot of another credential design interface according to another implementation of the invention.
Figure 8B:
FIG. 8B is a screenshot of an image-design interface according to the implementation of FIG. 8A.
Figure 8C:
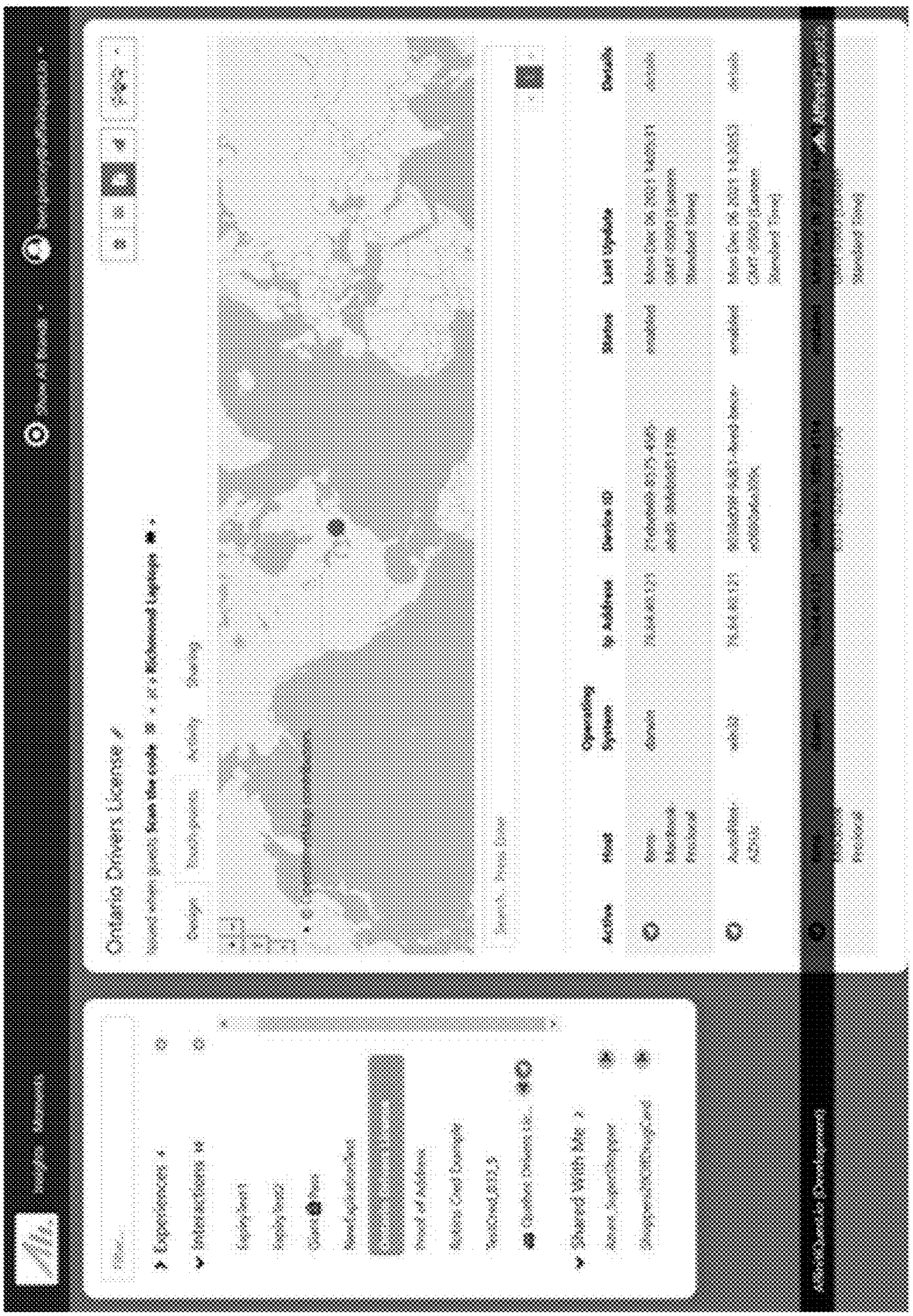
FIG. 8C is a screenshot of an auditing/mapping interface according to the implementation of FIG. 8A.

FIGS. 8A to 8C are images of another exemplary interface according to an implementation of the invention. Again, this interface is graphical and/or text-based. FIG. 8A shows a process-design interface for the credential (that is, for assigning desired attributes, desired results, etc.). FIG. 8B shows a credential-image-design interface for designing the look of the credential object that will be visible to the consumer user (e.g., as a digital 'card' in the wallet). FIG. 8C shows an audit and mapping interface that the issuing user can use to determine where the credential is available, when and where the credential has been issued, and other similar information.

As discussed above, many kinds and formats of design interface are possible. Additionally, it may be desirable to customize the design interface to fit in with the branding and/or general style of the organization itself.

In some embodiments, the system also uses biometric verification ("bioauthentication") methods. In these embodiments, a credential is configured to provide a biometric challenge at the time of issuance/verification (i.e., when presented to the user's device). In such embodiments, when a user seeks to obtain a credential (i.e., have a credential delivered to the device 50), part of the delivery process of that credential is a biometric check, such as a Face ID™ scan or other facial recognition scan, a fingerprint scan, a retinal scan, or any other suitable biometric check. Such a scan confirms that the active user of the device is the user associated with the device. In some embodiments, the verification device 70 may directly compare biometric information to verify the credentials. For example, some credentials have desired attributes that include biometric information (e.g., a driver's license photo may be compared with a Face ID™ scan). In such embodiments, the assessment of response values includes assessment of biometric information.

However, in other embodiments, the desired attributes do not include biometric information and no direct comparison is made. Rather, the user device 50 has previously saved bioauthentication information for its user and compares the result of the biometric challenge to that saved bioauthentication information. When the bioauthentication is successful, the device 50 informs the credential delivery device 60 that the bioauthentication was successful (i.e., the success result is accounted for in the response value sent to the credential delivery device 60).

Of course, in such embodiments, if the bioauthentication is unsuccessful, the response value accounts for an unsuccessful bioauthentication success result. That response value fails the verification process for delivering the credential object and a result associated with a failure is triggered.

Figure 9A:
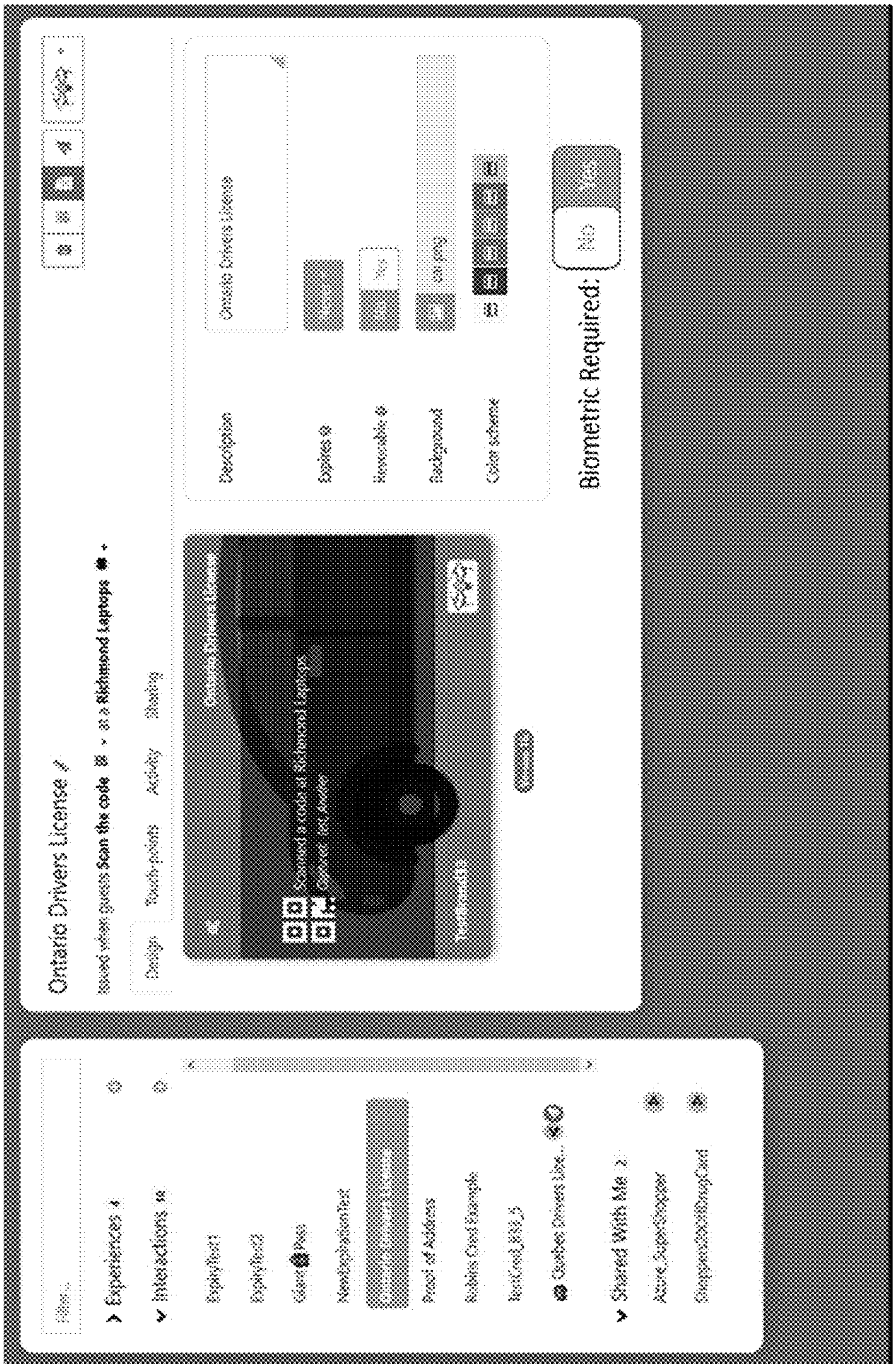
FIG. 9A is a screenshot of another credential design interface according to an implementation of the invention with bioauthentication.
Figure 9B:
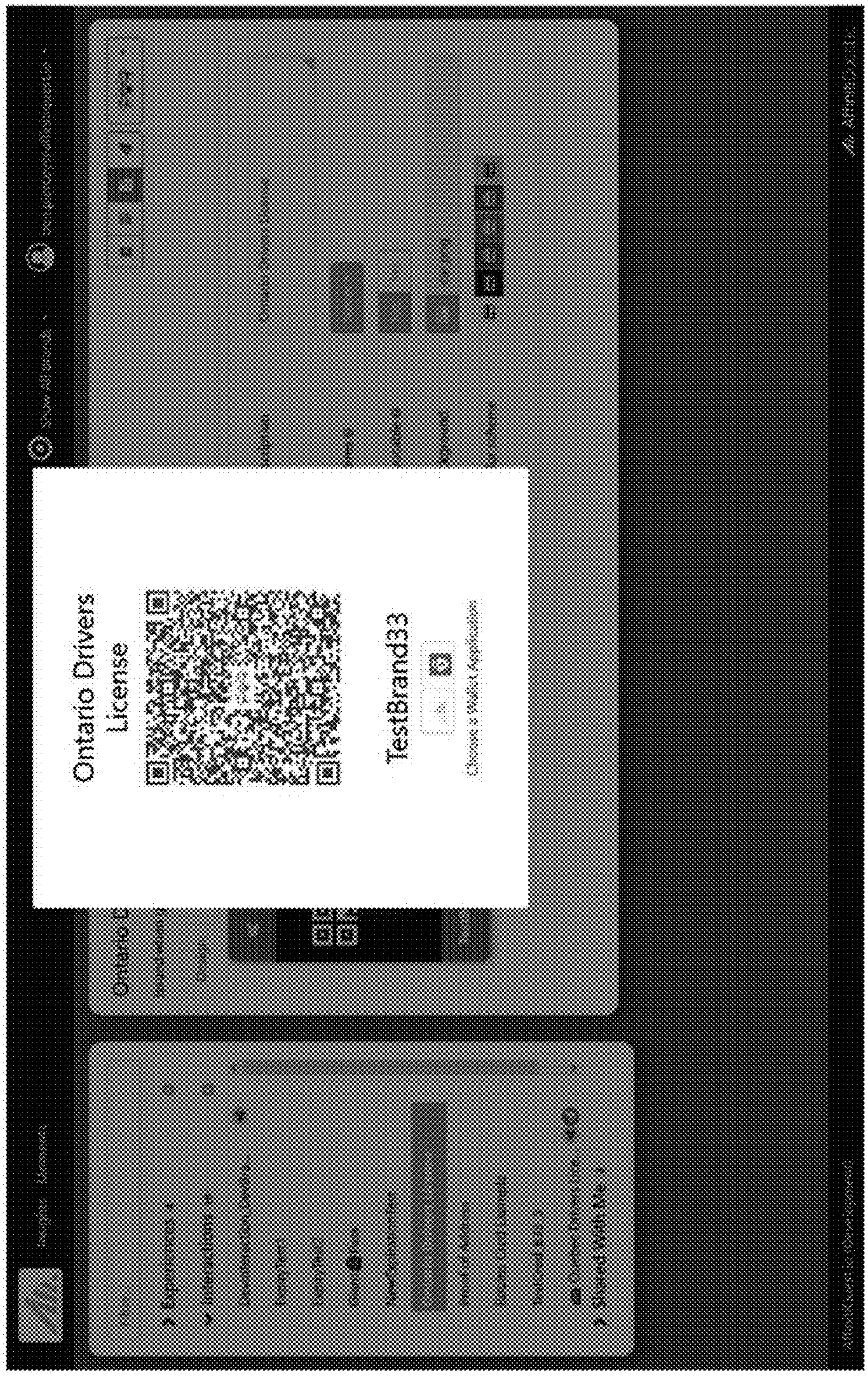
FIG. 9B is another screenshot of an interface according to the implementation of FIG. 9A.
Figure 9C:
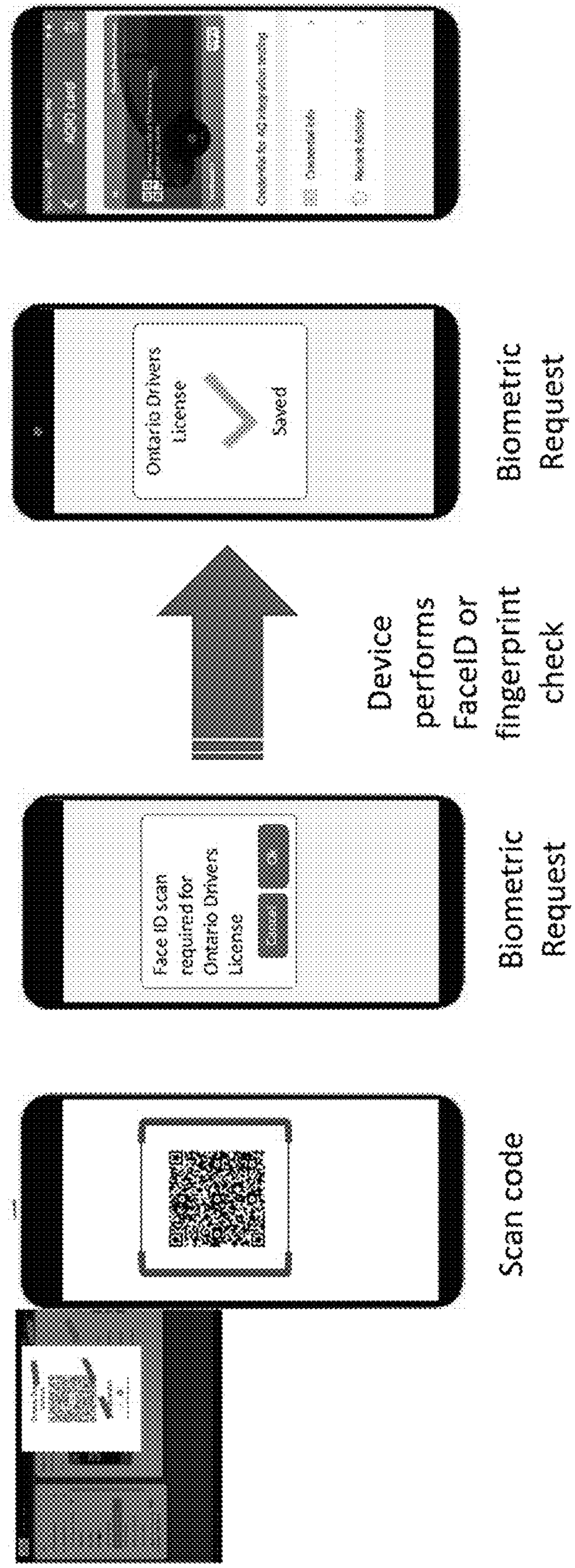
FIG. 9C shows a schematic representation of an exemplary bioauthentication process.

FIG. 9A shows a design interface similar to that in FIG. 8A, except that in FIG. 9A, the issuing user selects whether bioauthentication is required for a consumer user to obtain the credential. If bioauthentication is required (in a multi-wallet embodiment), the credential will only be available in wallet applications that support bioauthentication as described herein (i.e., the two wallet icons shown in FIG. 9B both support bioauthentication). FIG. 9C shows a schematic representation of an exemplary bioauthentication process. A QR code is scanned by the consumer user device 50 (or the delivery request is made in any other suitable way). The user device then receives a request for bioauthentication and conducts a biometric check. When the biometric check is successful, the credential is successfully delivered to the consumer user's device 50 and is visible in the consumer user's wallet application.

Figure 9D:
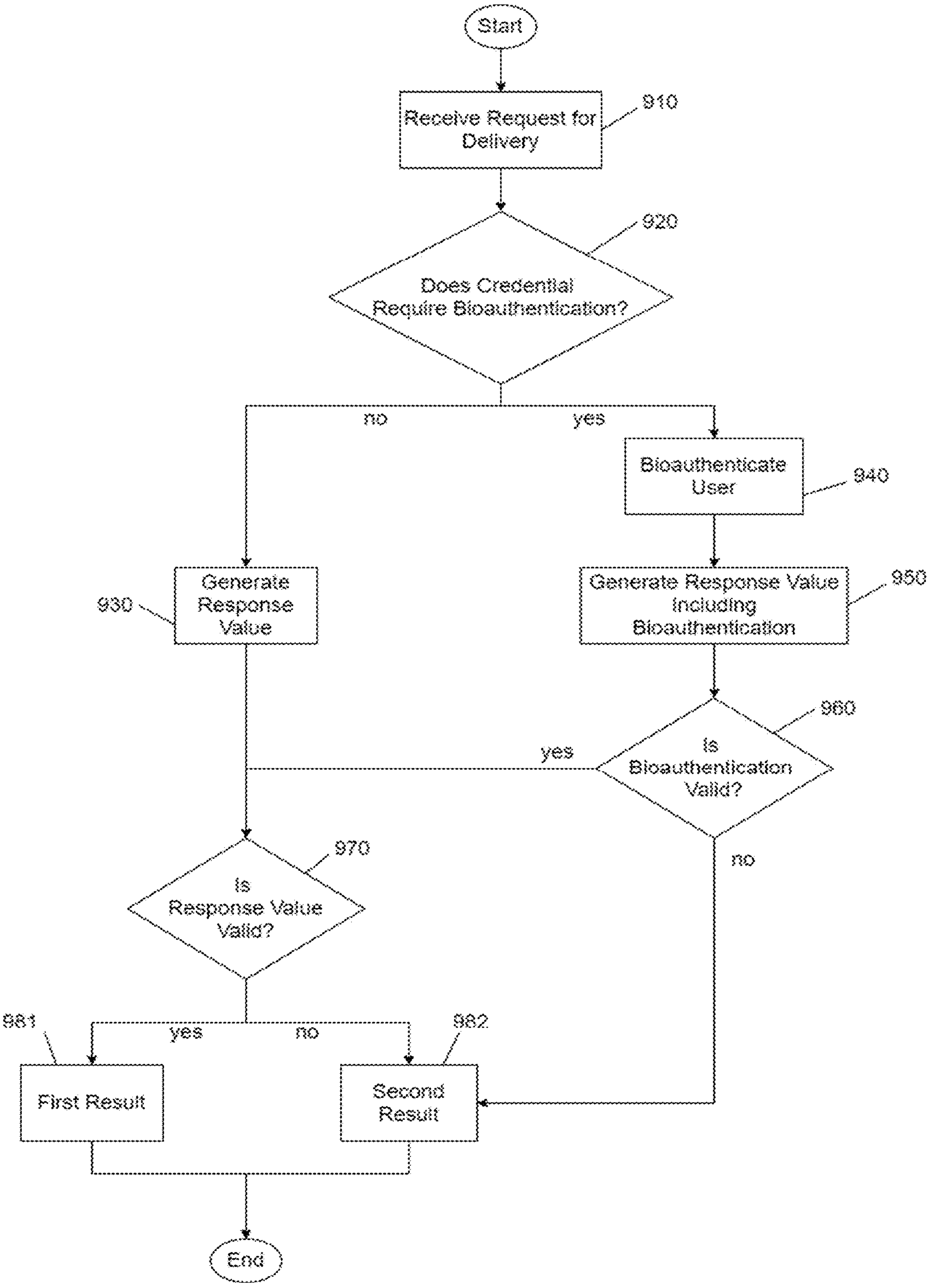
FIG. 9D is a flowchart detailing a bioauthentication process.

FIG. 9D is a flowchart detailing the bioauthentication method in more detail. At step 910, a credential delivery device receives a request to deliver a credential to a user device. At step 920, the user device determines whether the credential requires bioauthentication. If the credential does not require bioauthentication, the method proceeds to step 930 and a response value is generated based on non-biometric attributes. If the credential requires bioauthentication, however, the method proceeds to step 940, at which the user device conducts a bioauthentication process. The user device generates a response value that includes the bioauthentication result (step 950). The validity of the bioauthentication result is assessed at step 960. If the bioauthentication is successful, the method proceeds to step 970, where the response value is assessed. If the response value is valid, a first result (associated with having the credential) is triggered at step 981. If the response value is not valid, a second result (associated with not having the credential) is triggered at step 982. As well, if the bioauthentication result is found to be invalid at step 960, the second result is also triggered at step 982.

FIGS. 10A to 10D show process flows for an exemplary implementation of the invention, using proprietary and third-party systems, as well as standard programming languages, file types, and formats such as the well-known QR ("Quick Response") codes and JSON files. As would be clear to the person skilled in the art, these process flow diagrams show a sequence of steps/programming calls over time. The time axis runs longitudinally down the figure (i.e., events higher up of the figure occur earlier in the sequence than events lower down).

Figure 10A:
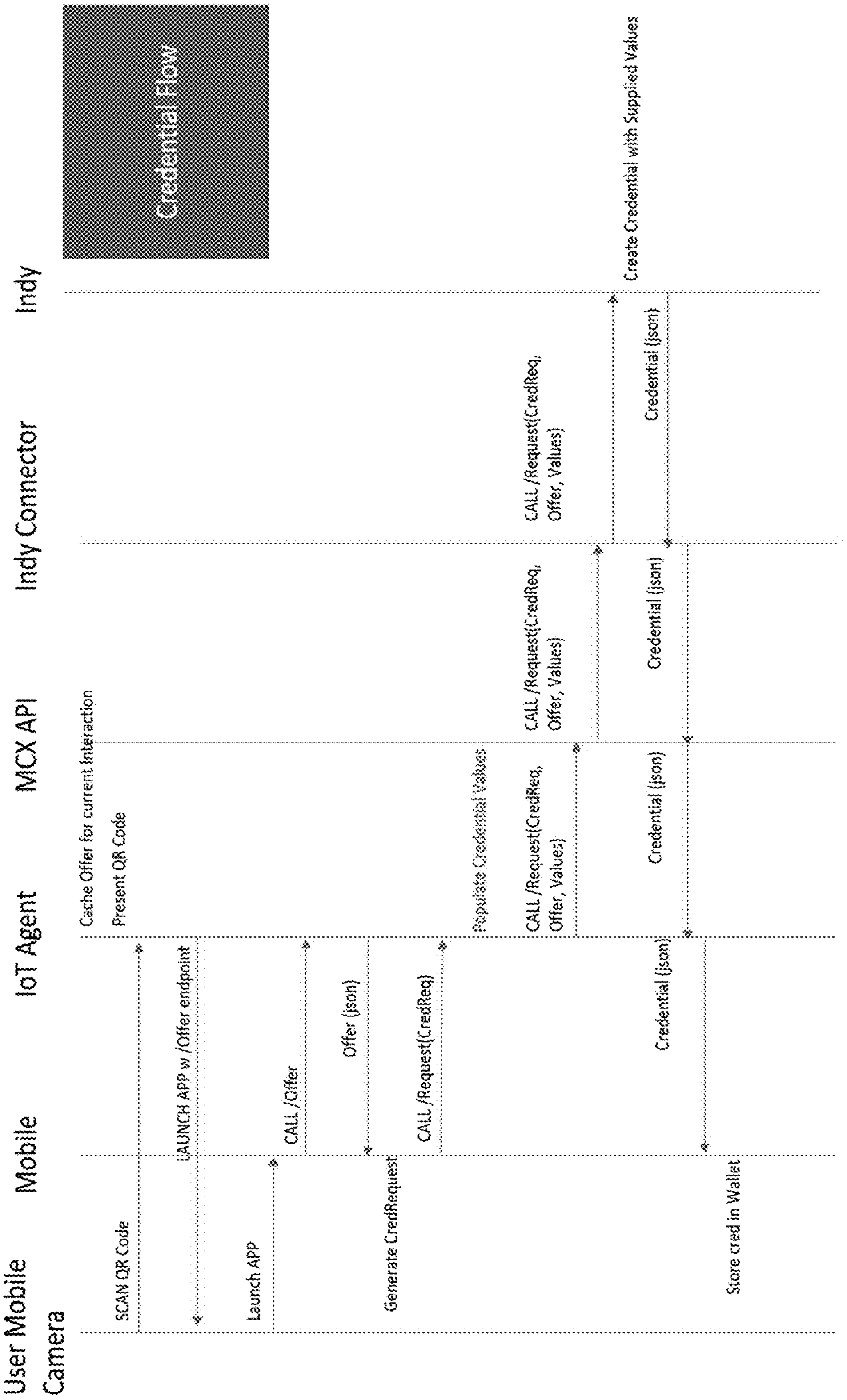
FIG. 10A is a process flow diagram showing an exemplary credential delivery process, according to one implementation of the invention.
Figure 10B:
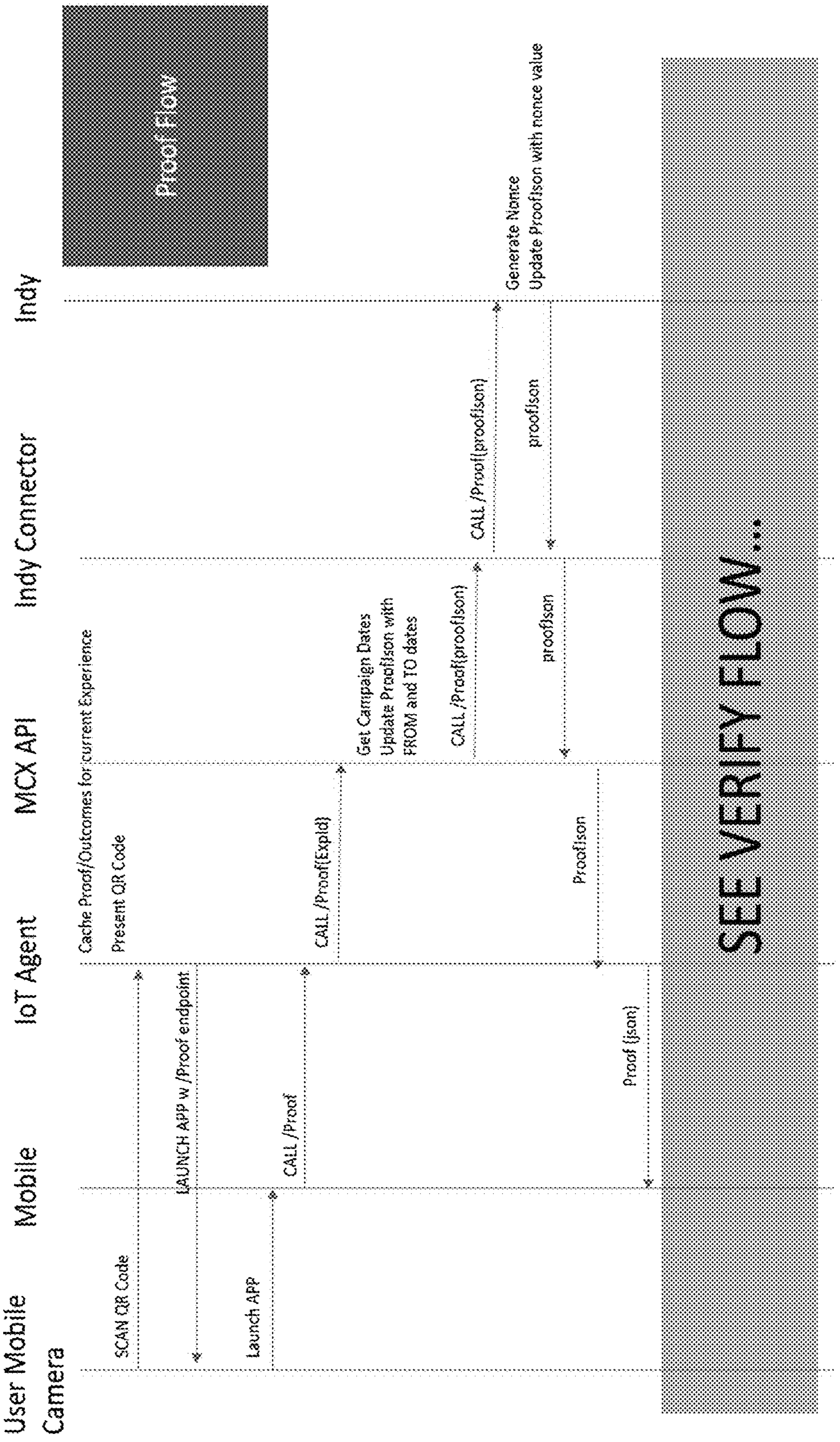
FIG. 10B is a process flow diagram showing an exemplary response value generation process, according to one implementation of the invention.
Figure 10C:
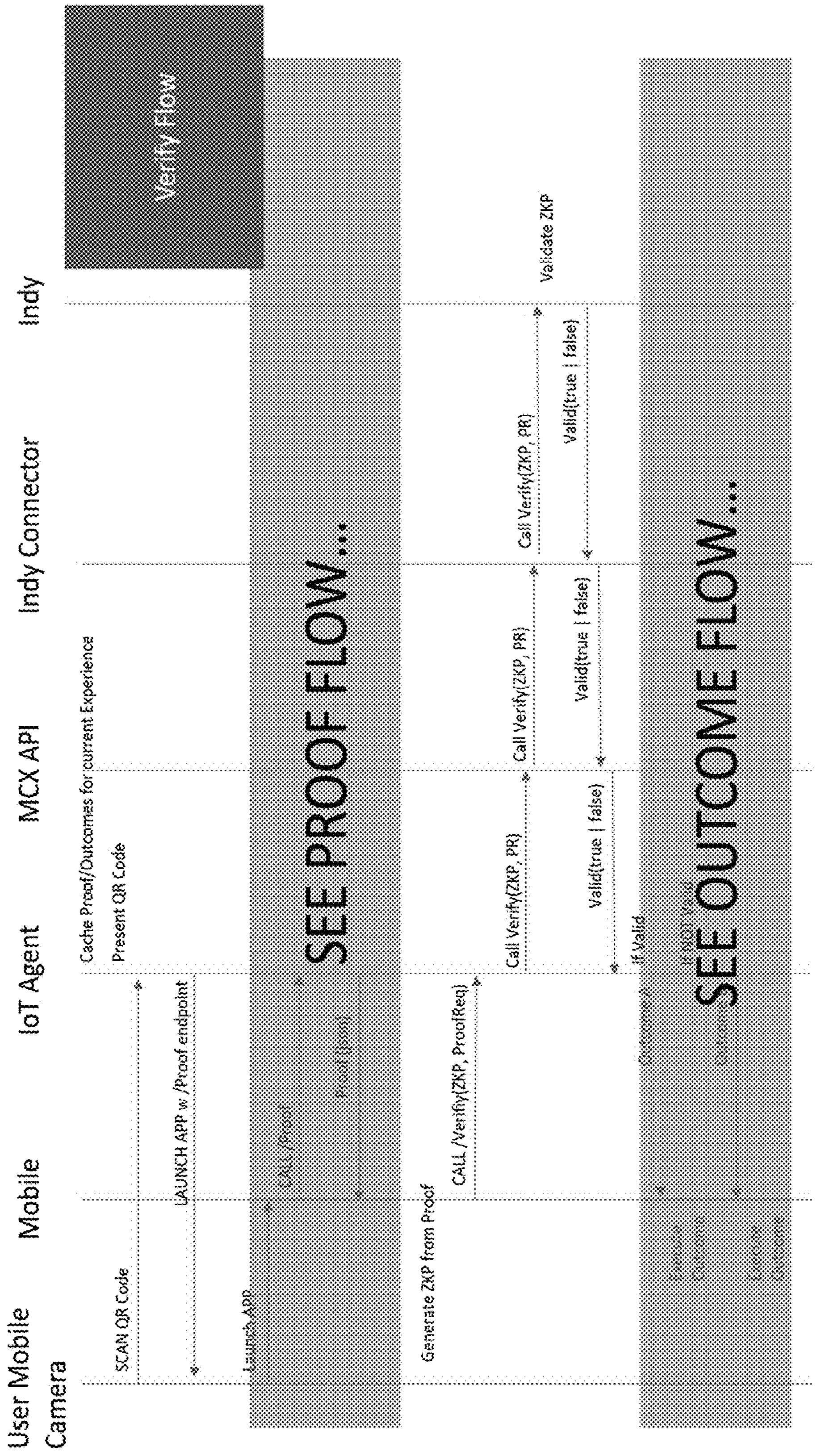
FIG. 10C is a process flow diagram showing an exemplary credential verification process, according to one implementation of the invention
Figure 10D:
FIG. 10D is a process flow diagram showing an exemplary result process, according to one implementation of the invention.

FIG. 10A illustrates a process flow for the delivery of a credential, beginning with the consumer user's request. FIG. 10B illustrates a process flow for prompting and generating a response value/proof value related to consumer data and a credential. At the bottom of this 'proof' flow, the box "See Verify Flow . . . " refers to FIG. 10C. FIG. 10C illustrates a process flow for verifying a credential, after the proof flow of FIG. 10B is complete. The response value in the illustrated functions is designated "ZKP" and the Proof Requirements (i.e., the portion of the credential schema data used to determine whether the proof is valid or invalid) are designated "PR". The bottom of this verification flow diagram, which is marked "See Outcome Flow . . . " refers to FIG. 10D, which shows an expanded view of the process flow once a credential has been verified (i.e., returning "Outcome A", a first outcome/result, when the proof is valid, and returning "Outcome B", a second outcome/result, when the proof is invalid).

Figure 11:
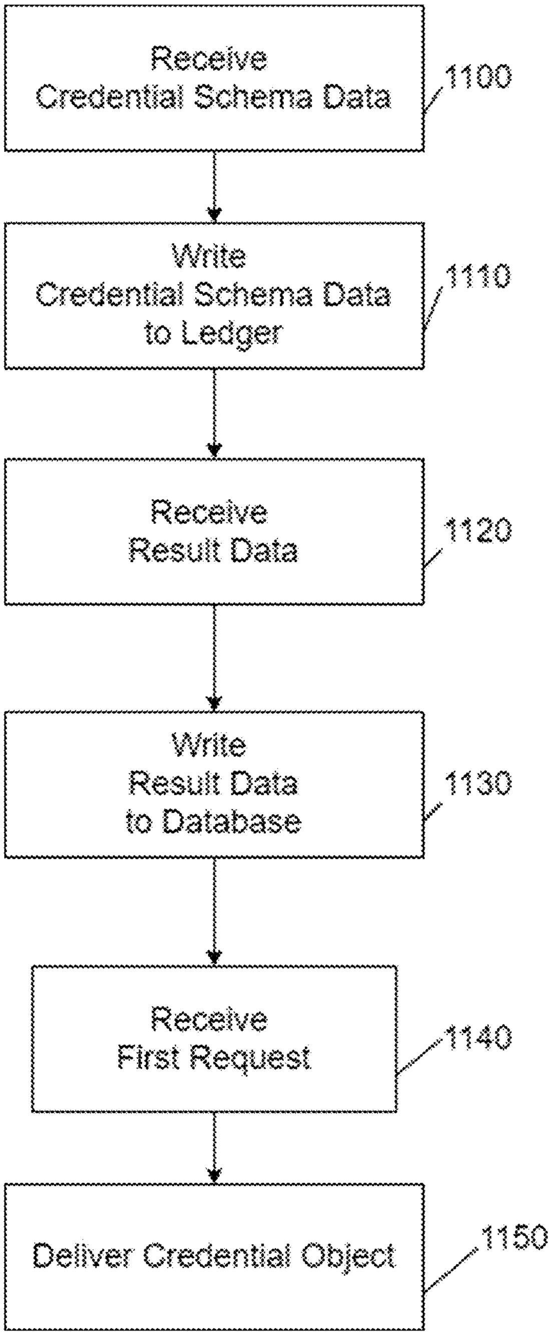
FIG. 11 is a flowchart detailing a method according to one aspect of the invention.

FIG. 11 is a flowchart detailing a method according to one aspect of the invention. At step 1100, credential schema data is received. The credential schema data is written to a distributed ledger at step 1110. At step 1120, result data is received. (In some embodiments, information regarding credential delivery may also be received at this step.) The result data is written to/stored in a database at step 1130. A first request is received from a consumer user's computing device at step 1140 (that is, a request for delivery of a credential object is received). At step 1150, any available credential object(s) ("available" credential objects being credential objects that the credential delivery device is able to deliver) is/are delivered to the consumer user's computing device.

Figure 12:
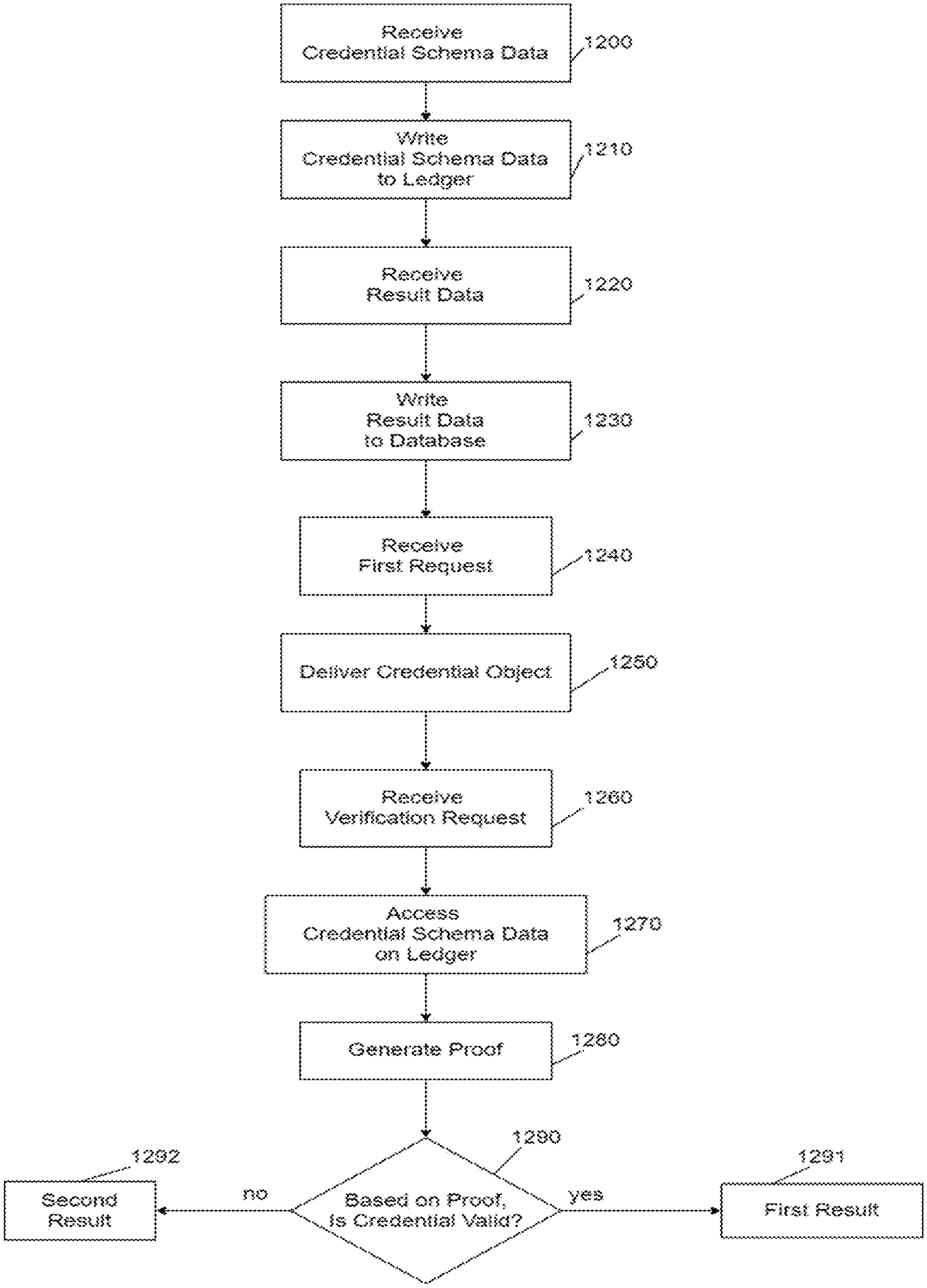
FIG. 12 is a flowchart detailing a further embodiment of the method of FIG. 11.

FIG. 12 is another flowchart, detailing a further embodiment of the method in FIG. 11. Steps 1200 to 1250 of FIG. 12 correspond to steps 1100 to 1150 of FIG. 11, as described above. At step 1260 of FIG. 12, a subsequent verification request is received from the computing device used by the consumer user. The credential verification device receiving that request then accesses the ledger to thereby access credential schema data for the relevant credential(s) at step 1270, and prompts the user's computing device to generate a response value. The response value is generated at step 1280 and passed to the credential verification device. The credential verification device verifies whether the response value is valid at step 1290. If the response value is valid (i.e., the credential is verified), a first result is prompted (step 1291). If the response value is invalid (i.e., the credential is not verified), a second result is prompted (step 1292).

As used herein, the phrase "at least one of [x] and [y]" is intended to mean and should be construed as meaning "[x], [y], or [x] and [y]".

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for distributed management of consumer data, the system comprising:

a server for:

receiving credential schema data from an organization user, said organization user being affiliated with an organization and said credential schema data comprising desired attributes of a specific credential, wherein said specific credential relates to said consumer data;

writing said credential schema data to a distributed ledger; and a credential delivery device for:

delivering a credential object to a computing device used by a consumer user in response to a first request from said computing device, said credential object being associated with said specific credential, and a design interface in communication with said server for enabling said organization user to create said credential schema data and said result data and for enabling said organization user to upload said credential schema data and said result data to said server, wherein said design interface is customized to said organization, wherein said credential object is verified by a credential verification device, and wherein:

said distributed ledger is accessed by said credential verification device such that said credential schema data is accessed by said credential verification device, wherein said credential verification device accesses said distributed ledger in response to a subsequent verification request from said computing device used by said consumer user;

said computing device used by said consumer user generates a response value based on an assessment of said consumer data and said credential schema data, said response value being devoid of any data from said consumer data and credential schema data;

said response value is passed to said credential verification device; and said response value is analyzed by said credential verification device to determine whether said response value conforms to at least part of said credential schema data, wherein, when said response value conforms to said at least part of said credential schema data, a first result is prompted by said credential verification device, and wherein, when said response value is non-conformant to said at least part of said credential schema data, a second result is prompted by said credential verification device.

2. The system according to claim 1, wherein said response value is at least one of: encrypted, and based on biometric data of said consumer user.

3. The system according to claim 1, further comprising a second interface for use on said computing device, wherein said second interface enables said consumer user to review and modify credential objects on said computing device.

4. The system according to claim 1, wherein said server receives result data from said organization user, wherein said result data relate to at least said first result and said second result, and wherein said server is further for writing said result data to a database.

5. The system according to claim 1, wherein at least one of said desired attributes relates to at least one of: a completion of a purchase by said consumer user; an indication of a preference by said consumer user; a completion of an experience by said consumer user; and an indication of an interest by said consumer user.

6. The system according to claim 1, wherein said credential delivery device prompts said consumer user to accept said credential object on said computing device.

7. The system according to claim 6, wherein a modification of a credential object comprises at least one of: a deletion of said credential object from said computing device and a temporary disabling of said credential object.

8. The system according to claim 1, wherein said first request, said delivery of said credential object, said subsequent verification request, and delivery of said first result and said second result are conducted using Near Field Communication (NFC).

9. The system according to claim 1, wherein said credential delivery device and said credential verification device form a single physical unit.

10. The system according to claim 1, wherein multiple organizations direct credential delivery devices to deliver credential objects based on a single credential schema.

11. The system according to claim 1, wherein said organization user shares said credential schema data with at least one other user.

12. A method for distributed management of consumer data, said method comprising the steps of:

receiving credential schema data from an organization user, said organization user being affiliated with an organization, said credential schema data comprising desired attributes of a specific credential, wherein said credential schema data is created via a design interface that is customized to said organization;

writing said credential schema data to a distributed ledger;

receiving, from a computing device used by a consumer user, a first request; and delivering a credential object to said computing device in response to said first request.

13. The method according to claim 12, further comprising the steps of:

receiving a subsequent verification request from said computing device;

accessing said distributed ledger in response to said subsequent verification request to thereby access said credential schema data;

prompting said computing device used by said consumer user to generate a response value based on said consumer data and said credential schema data;

receiving said response value from said computing device used by said consumer user; and analyzing said response value to determine whether said desired attributes are satisfied by said consumer data, when said response value indicates that said desired attributes are satisfied by said consumer data, passing a first result to said computing device; and when said response value indicates that said desired attributes are unsatisfied by said consumer data, passing a second result to said computing device.

14. The method according to claim 12, further comprising the steps of:

receiving result data from said organization user, said result data relating to at least a first result and a second result, said first result and said second result being associated with said specific credential; and writing said result data to a database.

15. The method according to claim 12, further comprising the step of prompting said consumer user to accept said credential object on said computing device.

16. The method according to claim 12, wherein said credential object on said computing device is reviewable and modifiable by said consumer user.

17. The method according to claim 16, wherein a modification of said credential object includes at least one of: a deletion of said credential object from said computing device and a temporary disabling of said credential object.

18. The method according to claim 12, wherein said response value is encrypted.

19. The method according to claim 12, wherein said delivering is performed after a user is successfully authenticated.

20. The method according to claim 19, wherein said user is authenticated using a biometric authentication process.

* * * * *